United States Patent
Wang et al.

(10) Patent No.: US 11,736,575 B2
(45) Date of Patent: *Aug. 22, 2023

(54) SYSTEMS AND METHODS FOR DYNAMICALLY CONNECTING NETWORK ELEMENTS TO ENABLE A SERVICE

(71) Applicant: Level 3 Communications, LLC, Broomfield, CO (US)

(72) Inventors: Jin-Gen Wang, Lafayette, CO (US); Michael Nyhus, Denver, CO (US); Craig Tystad, Castle Rock, CO (US); James M. Adkins, III, Elizabeth, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,115

(22) Filed: Aug. 25, 2022

(65) Prior Publication Data

US 2022/0407923 A1     Dec. 22, 2022

Related U.S. Application Data

(63) Continuation of application No. 15/452,352, filed on Mar. 7, 2017, now Pat. No. 11,431,808.

(Continued)

(51) Int. Cl.
*G06F 9/455* (2018.01)
*G06F 9/44* (2018.01)
(Continued)

(52) U.S. Cl.
CPC .......... *H04L 67/146* (2013.01); *H04L 12/462* (2013.01); *H04L 12/4641* (2013.01);
(Continued)

(58) Field of Classification Search
CPC combination set(s) only.
See application file for complete search history.

(56) References Cited

U.S. PATENT DOCUMENTS

| 5,933,425 | A | 8/1999 | Iwata | |
| 6,335,927 | B1* | 1/2002 | Elliott | H04L 63/083 |
| | | | | 370/352 |

(Continued)

FOREIGN PATENT DOCUMENTS

| WO | WO-2000007407 | 2/2000 |
| WO | WO-2015157947 | 10/2015 |

OTHER PUBLICATIONS

Extended European Search Report, dated Aug. 1, 2019, Application No. 17763904.4, filed Mar. 7, 2017; 7 pgs.

(Continued)

*Primary Examiner* — Kevin T Bates
*Assistant Examiner* — Golam Mahmud

(57) ABSTRACT

Apparatuses and methods are disclosed for managing network connections. A computing device accesses a request to provision a network connection associated with a first device. The request includes a plurality of connection parameters defining desired specifications for a network connection from the first device to a second device. The connection parameters are validated against information from a database and other predetermined rules. A network connection path is generated to connect the first device with the second device. The network connection path is generated by selecting network elements for the network connection that satisfy the connection parameters. Configuration information for the network elements of the network connection path is aggregated for a configuration system. The configuration information is used to provision the network connection.

19 Claims, 8 Drawing Sheets

Related U.S. Application Data

(60) Provisional application No. 62/350,962, filed on Jun. 16, 2016, provisional application No. 62/335,435, filed on May 12, 2016, provisional application No. 62/304,865, filed on Mar. 7, 2016.

(51) Int. Cl.

| | |
|---|---|
| *G06F 9/445* | (2018.01) |
| *H04L 12/24* | (2006.01) |
| *H04L 12/28* | (2006.01) |
| *H04L 29/06* | (2006.01) |
| *H04L 12/741* | (2013.01) |
| *H04M 3/00* | (2006.01) |
| *H04L 67/146* | (2022.01) |
| *H04L 12/46* | (2006.01) |
| *H04L 41/0806* | (2022.01) |
| *H04L 41/12* | (2022.01) |
| *H04L 67/10* | (2022.01) |
| *H04W 48/08* | (2009.01) |

(52) U.S. Cl.
CPC .......... *H04L 41/0806* (2013.01); *H04L 41/12* (2013.01); *H04L 67/10* (2013.01); *H04W 48/08* (2013.01)

(56) References Cited

U.S. PATENT DOCUMENTS

| | | | | |
|---|---|---|---|---|
| 7,155,534 B1* | 12/2006 | Meseck | ............... | H04L 41/0873 709/240 |
| 7,257,205 B2* | 8/2007 | Forte | ..................... | H04W 84/16 455/433 |
| 7,436,801 B1* | 10/2008 | Kanterakis | ............ | H04L 5/0055 370/329 |
| 7,590,539 B1* | 9/2009 | Kirkpatrick | ........... | H04L 51/224 379/88.04 |
| 7,665,064 B2* | 2/2010 | Able | ....................... | G06F 16/95 717/117 |
| 7,760,738 B1* | 7/2010 | Chamas | ................ | H04L 47/805 370/468 |
| 8,171,148 B2* | 5/2012 | Lucas | ..................... | H04L 65/60 709/228 |
| 8,213,926 B2* | 7/2012 | Ahmad | ................. | H04W 24/08 455/425 |
| 8,838,095 B2* | 9/2014 | Jouin | ................... | H04W 72/563 455/435.2 |
| 8,849,297 B2* | 9/2014 | Balasubramanian | ........................ | H04L 41/5054 455/452.2 |
| 9,306,949 B1* | 4/2016 | Richard | .............. | H04L 12/2859 |
| 9,436,443 B2* | 9/2016 | Chiosi | ................. | H04L 41/5048 |
| 10,003,495 B1* | 6/2018 | Sharma | .............. | H04L 41/0806 |
| 2002/0068554 A1* | 6/2002 | Dusse | ..................... | H04L 67/51 455/410 |
| 2005/0198247 A1* | 9/2005 | Perry | ........................ | H04L 9/40 709/223 |
| 2005/0220095 A1* | 10/2005 | Narayanan | ............ | H04L 69/329 370/389 |
| 2006/0050862 A1* | 3/2006 | Shen | ................... | H04L 61/5014 370/352 |
| 2006/0239289 A1* | 10/2006 | Zheng | ................... | H04L 12/185 370/256 |
| 2007/0022469 A1* | 1/2007 | Cooper | ................. | H04L 9/3247 726/3 |
| 2008/0002576 A1* | 1/2008 | Bugenhagen | ....... | H04L 67/1012 370/229 |
| 2008/0229095 A1 | 9/2008 | Kalimuthu et al. | | |
| 2008/0310430 A1 | 12/2008 | He | | |
| 2009/0073988 A1* | 3/2009 | Ghodrat | .............. | H04L 43/0811 370/395.53 |
| 2009/0116404 A1* | 5/2009 | Mahop | ................ | H04L 41/0213 370/254 |
| 2010/0124196 A1* | 5/2010 | Bonar | ................... | H04W 16/16 455/445 |
| 2010/0128639 A1 | 5/2010 | Dehaan | | |
| 2011/0319061 A1* | 12/2011 | Schmackpfeffer | .... | H04L 51/224 455/415 |
| 2013/0107752 A1* | 5/2013 | Kadakia | .............. | H04L 65/1073 370/254 |
| 2013/0290690 A1 | 10/2013 | Nucci | | |
| 2014/0185531 A1* | 7/2014 | Liu | ....................... | H04L 45/125 370/329 |
| 2014/0277788 A1* | 9/2014 | Forbes, Jr. | ............. | G05B 19/02 700/286 |
| 2014/0279413 A1* | 9/2014 | Stollarski | ............... | G06Q 30/04 705/39 |
| 2014/0313932 A1* | 10/2014 | Saltsidis | ................. | H04L 45/46 370/254 |
| 2015/0030027 A1* | 1/2015 | Manzella | ............ | H04L 12/4625 370/392 |
| 2015/0109967 A1* | 4/2015 | Hogan | ................ | H04L 12/1407 370/259 |
| 2015/0146537 A1* | 5/2015 | Panaitopol | ........ | H04W 28/0215 370/236 |
| 2015/0188945 A1* | 7/2015 | Kjeldaas | ............. | G06F 21/6245 726/1 |
| 2015/0381515 A1* | 12/2015 | Mattson | .................. | H04L 47/70 707/722 |
| 2016/0127454 A1* | 5/2016 | Maheshwari | ....... | H04L 67/1097 709/223 |
| 2016/0308905 A1* | 10/2016 | Stiekes | .................. | H04L 63/166 |
| 2016/0315815 A1* | 10/2016 | Sharma | .................. | H04L 45/026 |
| 2017/0005928 A1* | 1/2017 | Theogaraj | ........... | H04L 12/4641 |
| 2017/0012900 A1* | 1/2017 | Singamsetty | ........... | H04L 45/26 |
| 2017/0033982 A1* | 2/2017 | Ruble | ................. | H04L 41/0846 |
| 2017/0257439 A1 | 9/2017 | Wang et al. | | |

OTHER PUBLICATIONS

International Preliminary Report on Patentability, dated Sep. 11, 2018, Intl Appl. No. PCT/US17/021163, Int'l Filing Date Mar. 7, 2017; 7 pgs.

International Search Report dated Jun. 30, 2017, Int'l Appl. No. PCT/US17/021163, Int'l Filing Date Mar. 7, 2017; 5 pgs.

Written Opinion of the International Searching Authority dated Jun. 30, 2017, nt'l Appl. No. PCT/US17/021163, Int'l Filing Date Mar. 7, 2017; 5 pgs.

\* cited by examiner

SYSTEMS AND METHODS FOR DYNAMICALLY CONNECTING NETWORK ELEMENTS TO ENABLE A SERVICE

TECHNICAL FIELD

Aspects of the present disclosure involve establishing connections between remote networking devices in order to enable some telecommunications service, and more particularly, involve systems and methods for accessing a request to connect a first device to a second device, validating connection parameters of the request, generating a connection path between the first and second device by assigning network elements based on the connection parameters, and preparing configurations for the network elements.

BACKGROUND

A telecommunications provider must often establish data link layer connections between network devices on behalf of customers, which may enable or provide access to a service or enhance a customer's network in some form. The data link layer corresponds to Layer 2 of the commonly-referenced multi-layer communication model known as the Open Systems Interconnection (OSI) model. The data link layer is concerned with moving data across the physical links of the network using switches, routers, media access controls, and related components. The data link layer provides the functional and procedural means to transfer data between network entities. As one basic example of a data link layer connection, a first device may be logically connected to a second device remote from the first device to expand a customer network. Various intermediate devices may need to be activated and configured to logically connect the first device to the second device.

Conventional procedures to establish data link layer connections may have some disadvantages. For example, conventional procedures involve a customer contacting a telecommunications provider, requesting a new connection, executing a contract for the service, and the like. Thereafter, a network engineer may need to manually design the connection path and also activate and configure devices for the connection path. Hence, the procedures are time consuming, manual, and otherwise complicated. It is with these observations in mind, among others, that various aspects of the present disclosure were conceived and developed.

SUMMARY

One implementation of the present disclosure may take the form of a method of dynamically establishing a telecommunications service, comprising the steps of utilizing a processor in communication with a tangible storage medium storing instructions that are executed by the processor to perform operations comprising: accessing a request to provision a network path between a first device and a second device, the request including a plurality of connection parameters defining the network path; and generating the network path, the network path comprising network resources that logically interconnect the first device with the second device, comprising: accessing data identifying a network resource from a database connectable to the first device, assigning the network resource to the network path and satisfying the plurality of connection parameters, and accessing configuration attributes associated with the first device, the second device, and the network resource from the database to generate a configuration file for configuring the first device, the second device, and the network resource as defined by the plurality of connection parameters.

Another implementation may take the form of an apparatus for a telecommunications service, comprising a computing device; and a network device, wherein the network device accesses an Ethernet virtual Connection (EVC) generated by the computing device, and wherein the EVC is generating using a plurality of connection parameters and by referencing a database storing information about a plurality of network resources, and wherein the computing device is operable to generate a configuration file comprising configuration attributes associated with the network device and devices of the EVC, with data of the configuration file utilized for activating and configuring the devices of the EVC.

Another implementation may take the form of a system for providing a telecommunications service, comprising: a network interface device; and a computing device, operable for: receiving a request to provision a network path associated with the network interface device, the request comprising a plurality of connection parameters, selecting a network resource to assign to the network path using the plurality of connection parameters, the network resource being connectable to the network interface device, accessing configuration attributes for the network interface device and the network resource from a database, and generating a configuration file using data associated with the configuration attributes.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
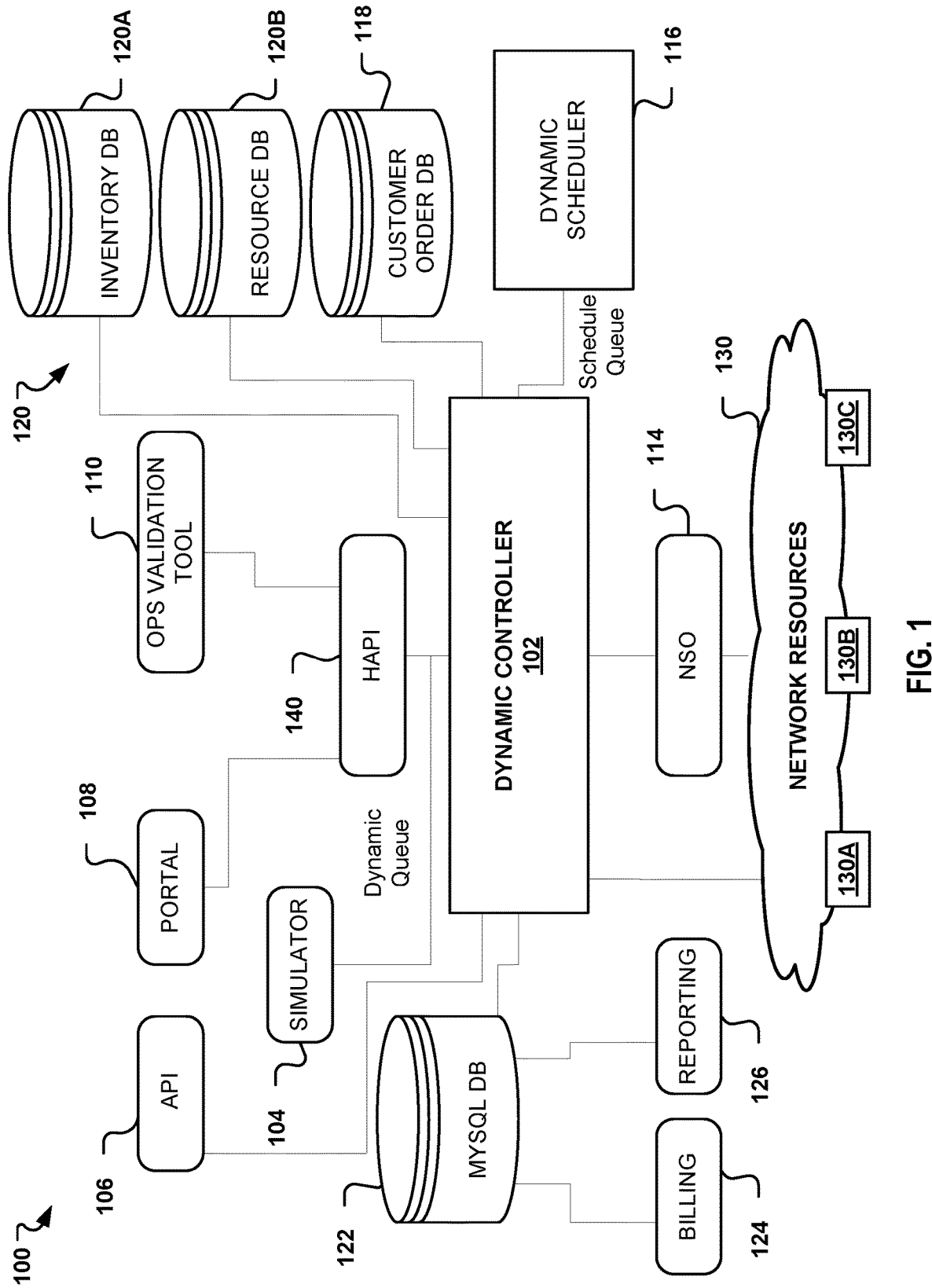
FIG. 1 illustrates an exemplary system operable to manage requests for network services and provide dynamic connections in a network, according to aspects of the present disclosure.

A system and methods are disclosed involving a controller (referred to herein as a "dynamic controller"), which may be realized on one or more server-type hardware computing devices, that generates layer 2 network connections between devices associated with a telecommunications network. In particular, responsive to a request, the dynamic controller generates a network connection path between two or more endpoint devices. The path involves any number of network resources and the dynamic controller generates the layer 2 connection to logically interconnect the endpoint devices so that communications may proceed over the path. The new path may enable access to a telecommunication service, or enhance a customer network in some form, among various possible advantages. For example, a customer's network endpoint device may be connected to other devices to enhance or expand the customer's network, or provide the customer with access to a new service using the path.

More specifically, the dynamic controller receives a request or is otherwise accessed to generate a network connection. Whether through a request or otherwise, the dynamic controller receives one or more connection parameters associated with the network connections and path to be generated. For example, the dynamic controller may receive a connection parameter identifying a customer network interface device. The network interface device may be a first device endpoint for the network connection path being generated. Another connection parameter of the request may identify a second network device (or interface), which may serve as a second device endpoint of the path being generated. For example, to establish a network path for a customer to access a cloud service, the second endpoint device may be a cloud service network interface, and the cloud services accessed by the customer may proceed over the network connection path being generated between the customer's endpoint device and the cloud service interface. So, for example, a customer that seeks to enable a cloud service at a field office may access a portal and select a first endpoint device at the field office and a second endpoint device associated with the desired cloud service. Other connection parameters may define a class of service for the requested network connection, a bandwidth for the network connection, and a list of virtual local area networks (VLANs) that may use the network connection.

Before generating any connections to establish the path, the dynamic controller validates the connection parameters for the requested network connection(s). For example, the dynamic controller accesses information about the customer's network interface device to determine whether the network connection desired by the customer is supported by the customer's device. The dynamic controller may also access information concerning the second network device and whether it has available ports or interfaces to generate the requested service or connection.

Once the connection parameters are validated, the dynamic controller generates a network connection path between the customer's network interface device (first endpoint device) and the second network device (second endpoint device) by assigning intermediate network elements to the network connection path accounting for any requirements of the connection parameters. The combination of the endpoint devices and the intermediate network elements define the path, which may be across a network of preexisting network elements. Such network elements may include provider edge devices, devices of a metro ring or metro Ethernet network, switches, routers, virtual gateway devices, virtual private cloud interfaces, and the like. Assigning network elements to the path involves verifying that the network elements are available for the requested connection and that the network elements satisfy the connection parameters. Then, the dynamic controller initiates the necessary configurations for each device in the path.

More particularly, to establish the path, the dynamic controller may need to activate and configure each of the network elements for the path. Hence, the dynamic controller activates and prepares configurations for the network elements. Specifically, the dynamic controller accesses device configuration attributes, such as from a database, for each network element of the network connection path that are needed to be able to implement the network elements for the network connection path. Device configuration attributes may include media access control (MAC) addresses, Internet Protocol (IP) addresses, and port information associated with the network elements. The dynamic controller may access the device configuration attributes at the same time as the network connection path is being generated.

The dynamic controller may aggregate each of the device configuration attributes within a centralized configuration file. The configuration file specifies configurations for the network elements defined by the device configuration attributes and connection parameters. The configuration file can be transmitted to a configuration system that applies the configurations to each of the network elements of the network connection path using the configuration file. Configuring a device may involve activating ports for the network elements of the network connection path. Prior to generating the file, the dynamic controller may validate (as discussed below), the device configuration attributes and configurations to reduce the possibility of configuration failures by the configuration system.

Utilizing a dynamic controller as disclosed herein may enable a telecommunications provider to generate connections between remote customer devices, and connections to devices associated with cloud service providers, enterprises, and/or broadcasters, etc. For example, by using the dynamic controller and leveraging existing port connections of a telecommunications network, the dynamic controller may allow customers to establish connections for data backup to data centers, application access, cloud access, or to exchange information with new partners or clients. Moreover, the system disclosed may facilitate the temporary turn up of such services, essentially on-demand, using underutilized resources already deployed in the telecommunications network where the system can access those resources, identify available connections, and configure the same to provide the service. Such a system may eliminate waiting for network configuration, circuit turn-up, or technician involvement. Network services utilizing the network connections according to the systems/methods herein include, by non-limiting example, Ethernet Virtual Connection (EVC), Ethernet access, IP virtual private network (VPN), high-speed Internet service, cloud services, and the like.

FIG. 1 illustrates a system 100 for implementing aspects of the present disclosure including establishing data link layer connections dynamically to generate a network path between two end points. A dynamic controller 102 is shown which may be utilized by a service provider to manage functionality for building network paths, which may include Ethernet virtual connections or other connections as discussed herein. While not being limited to any particular programming language, the dynamic controller 102 may comprise a C++ multi-threaded, high-performance, high-reliable, and real-time application that services connection requests either from a portal 108 (such as a customer portal/web interface or application) or directly from calls using an application programming interface (API) 106. The dynamic controller 102 is in communication with or otherwise has access to information about network resources 130, such as network resource 130A, network resource 130B, and network resource 130C. Such network resources 130, which may also be referred to as network elements, may include switches, routers, or other such networking resources associated with a core network, metro ring networks, or other networks that form or are otherwise associated with a service provider network such as a telecommunications network and involved in providing layer 2 interconnectivity in the network.

The dynamic controller 102 is further connected to or has access to one or more databases 120 the dynamic controller 102 may access when generating a connection path. In one embodiment, the databases 120 include an inventory database (DB) 120A which may contain information about the topology of the network resources 130, may define the various types of each network resource 130, and how each device is commonly used for a network connection (how it is typically positioned hierarchically within a connection path), how the network resources 130 are physically interconnected, some or all of which may be useful for building a connection path. As such, the inventory database 120A may be referenced by the dynamic controller 102 to generate the path, including the order of devices in a connection path, as described herein. For example, the inventory database 120A may contain information defining that the network resource 130A is a switch utilized with a metro ring accessible by a particular customer device. The databases 120 may further include a resource database 120B. The resource database 120B may contain or have access to information about port/interface availability for each of the network resources 130, what device configuration attributes are needed to configure interfaces for each of the network resources 130, and the like. For example, the resource database 120B may contain information defining that the network resource 130A has an available port P1, and that configuration attributes X, Y, and Z are needed to configure the network resource 130A for a given network connection. The dynamic controller 102 communicates with and updates the information stored within the databases 120 as the dynamic controller 102 is building, modifying, or tearing down various network connections, as described herein.

The dynamic controller 102 may further have access to a MySQL database 122 for billing 124 and reporting purposes 126; and a customer order database 118 to track orders and connections requested by customers, any of which contains information used by the dynamic controller 102 to build a network connection path and prepare configurations for devices of the network connection path as described herein. It should be understood that the depicted databases are merely exemplary and that additional databases or storage repositories are contemplated. In some embodiments, the information from the databases 120, the customer order database 118, and the MySQL database 122 may be aggregated for use by the dynamic controller 102.

The dynamic controller 102 may be in communication with any number of different devices, applications, modules, systems or components to execute the functionality described herein. For example, the dynamic controller 102 may utilize a simulator 104, comprising an application or system operable to simulate a network connection path. The dynamic controller 102 may utilize a HAPI application 140 to provide real time measurement within a network and determine whether any one of the network resources 130 has bandwidth for a new interface configuration or to provide statistics about the network resources 130. The dynamic controller 102 may provide access to an operations (OPS) validation tool 110 to troubleshoot network connections and connection paths, and the dynamic controller 102 may utilize a dynamic scheduler 116 to manage requests for connections received via the portal 108 and API 106.

The dynamic controller 102 may further be implemented with any number of different modules or components as needed. As shown in the diagram 150 of FIG. 2, the dynamic controller 102 may involve a task manager 152 operable to handle, perform, execute, and manage the following tasks and/or functions or modules (of the dynamic controller 102): an HTTP Message handler module 154, a message dispatcher module 156 (such as an open source message broker), a service data collection module 158, a customer data collection module 160, a business rules module 162 to track rules applicable to certain customer accounts, a path builder module 164, a resource manager module 166, a database manager module 168 communicably coupled to the MySQL database 122 (and/or the resource database 120B and customer order database 118), a reporting module 170, a billing module 172, a configurator module 174, a finite-state machine (FSM) 176, a Log/Logging module 178, and a configuration module 180. The dynamic controller 102 may utilize any one or more of the above features, but is not limited to the same.

As further shown in FIG. 1, the dynamic controller 102 is connected to a network service orchestration (NSO) system 114. The NSO system 114 is in communication with the network resources 130, such as the network resource 130A, the network resource 130B, and the network resource 130C. As described herein, the dynamic controller 102 retrieves or accesses device configuration attributes that are needed to configure devices for a connection path and makes such configuration attributes available to the NSO system 114. The NSO system 114 comprises any configuration system, and may include one or more computing and network devices, which are operable to apply or implement configurations, defined by the device configuration attributes, to any one of the network resources 130 to provision a network connection.

Figure 3A:
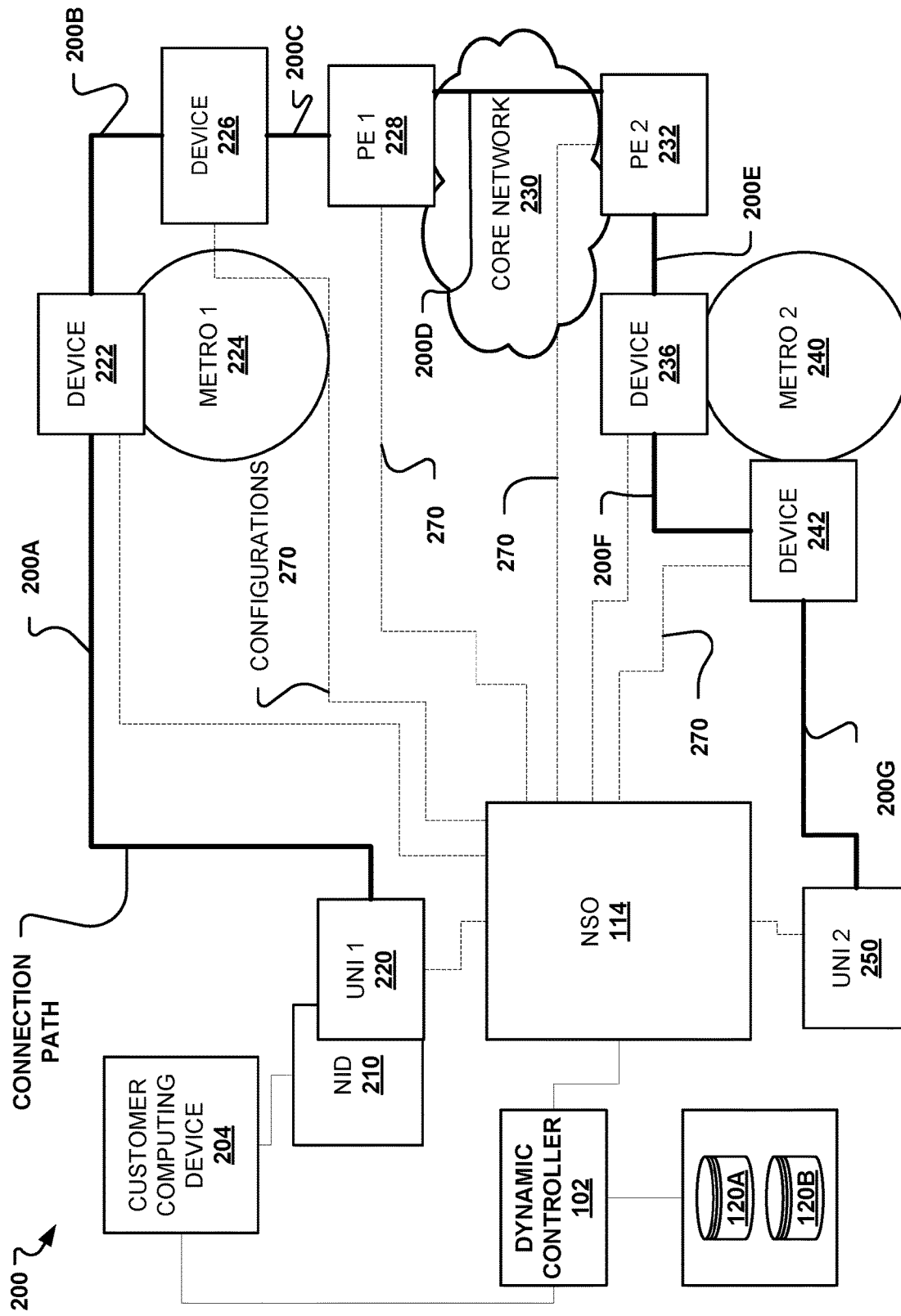
FIG. 3A illustrates an exemplary connection path for one implementation of a data link layer connection, according to aspects of the present disclosure.
Figure 3B:
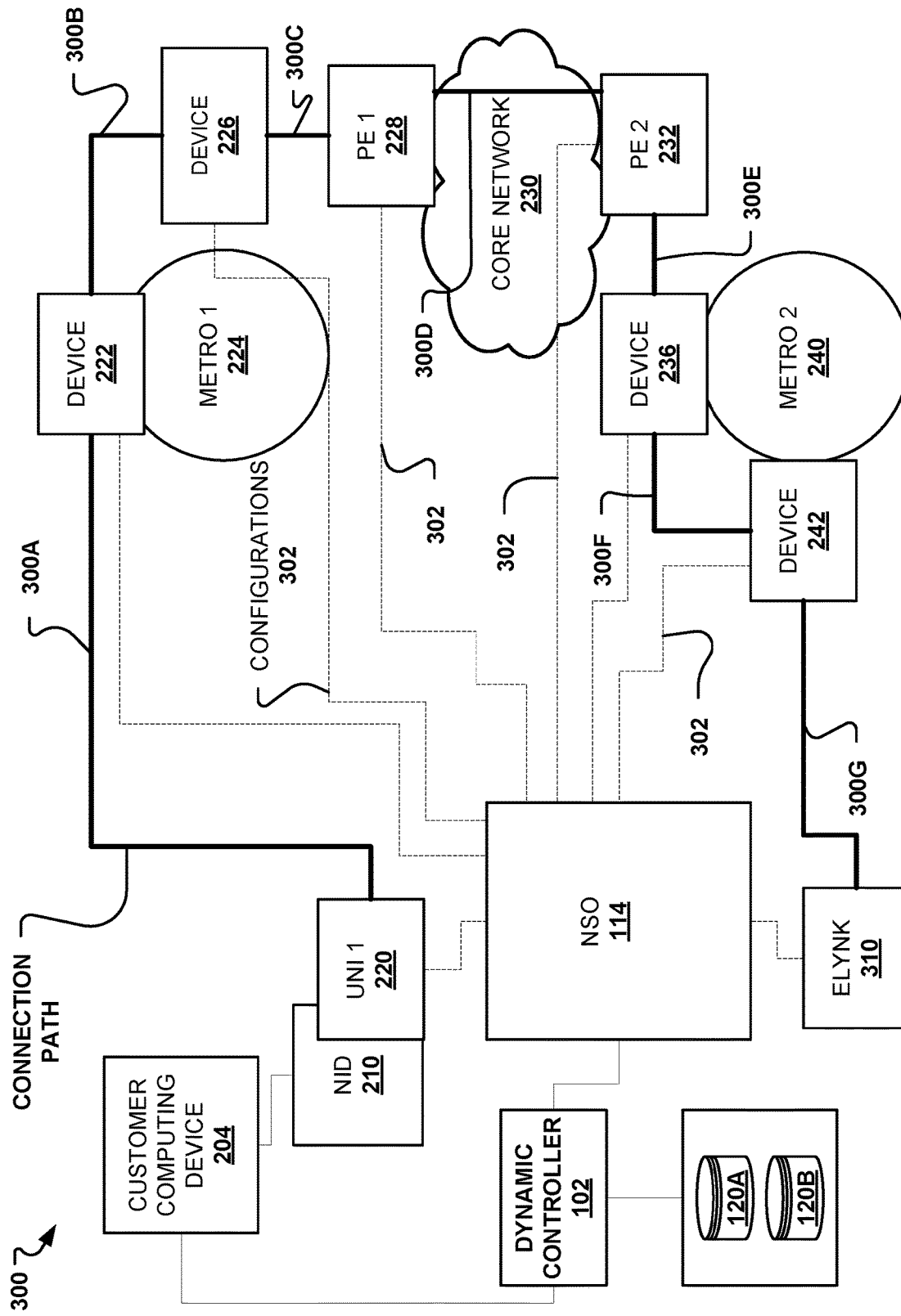
FIG. 3B illustrates an exemplary connection path for another implementation of a data link layer connection, according to aspects of the present disclosure.
Figure 3C:
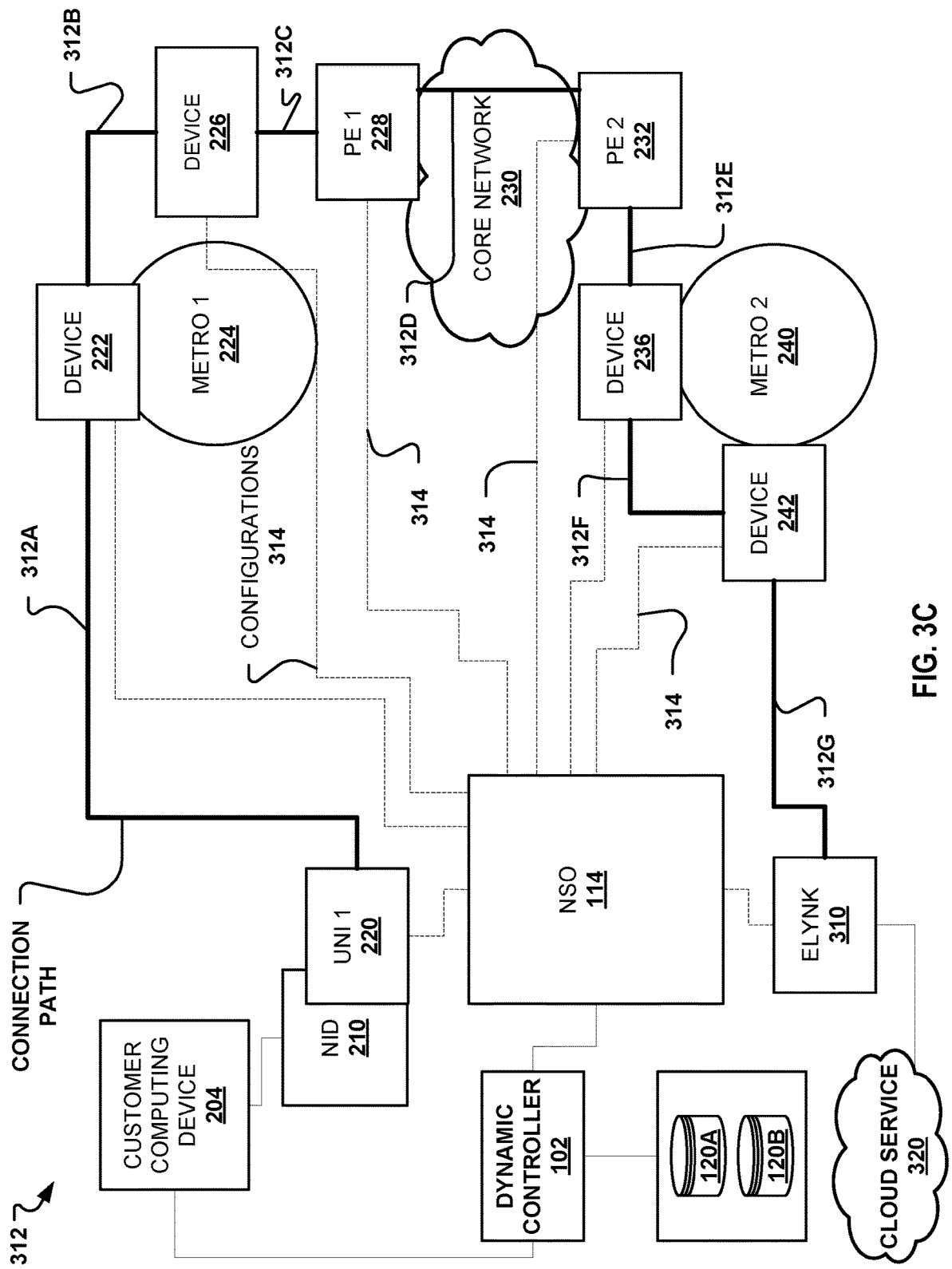
FIG. 3C illustrates an exemplary connection path for another implementation of a data link layer connection, according to aspects of the present disclosure.
Figure 3D:
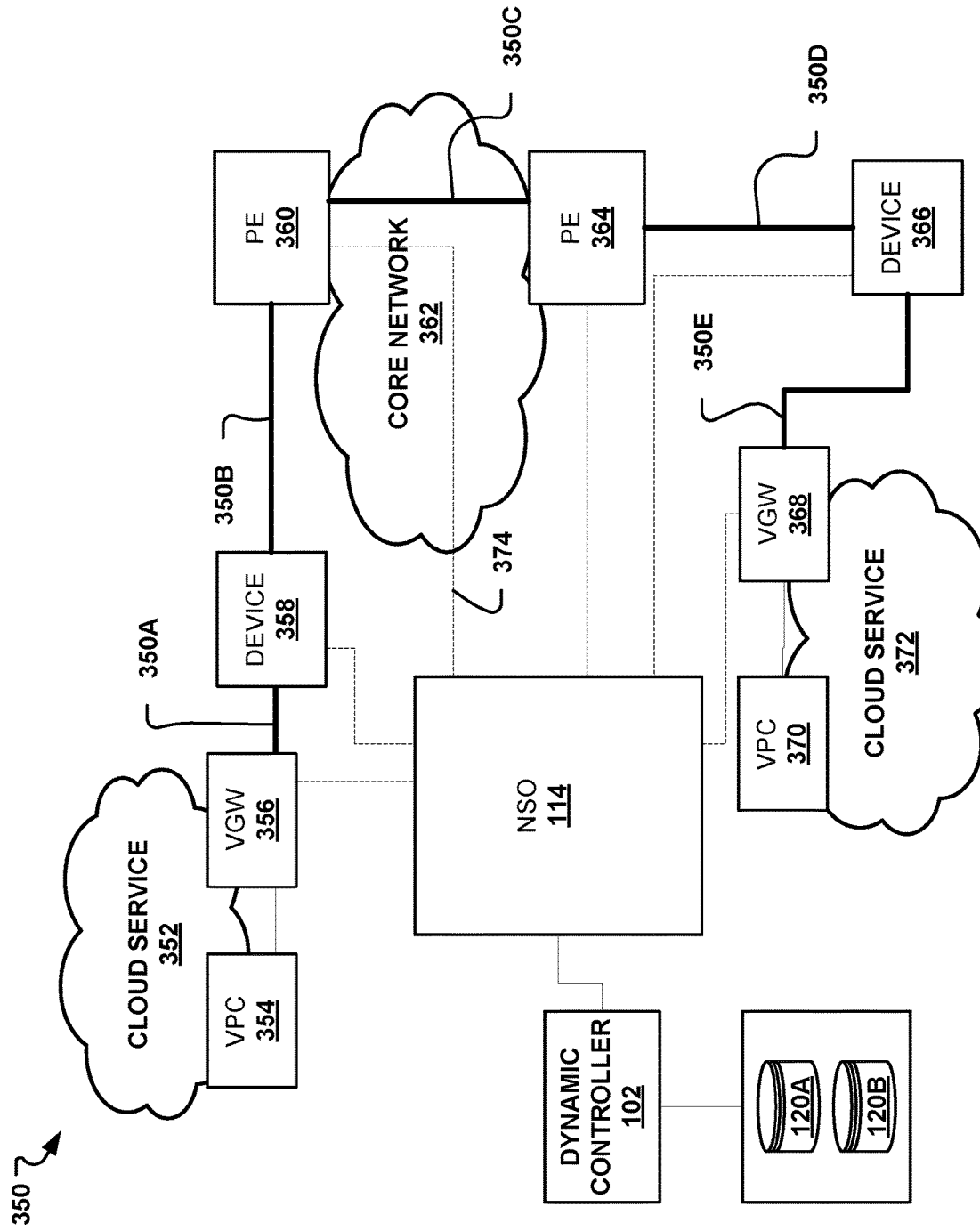
FIG. 3D illustrates an exemplary connection path for another implementation of a data link layer connection, according to aspects of the present disclosure.

The dynamic controller 102 may be utilized to generate any number of different types of connection paths for requested network connections. FIGS. 3A-3D show examples of network connection paths that may be generated by the dynamic controller 102 to interconnect devices for a network connection. For example, FIG. 3A is an exemplary network connection path 200, such as an EVC, involving a first multiplexed user network interface (UNI) 1 220 associated with one endpoint network interface device such as the Network Interface Device (NID) 210, and another multiplexed UNI associated with a second device (which may also be a customer device). The network connection path 200 of FIG. 3A may be referred to as a UNI-UNI scenario. FIG. 3B illustrates another connection path 300 which may be generated for a network connection involving an Elynk interface 310 which is a specialized interface that may be used to modify VLAN tags. FIG. 3C depicts another network connection path 312 involving the connection of the UNI 1 220 to a cloud environment. FIG. 3D depicts another network connection path 350 for connecting different cloud environments. Greater detail regarding the connection paths of FIGS. 3A-3D shall be discussed herein.

Figure 2:
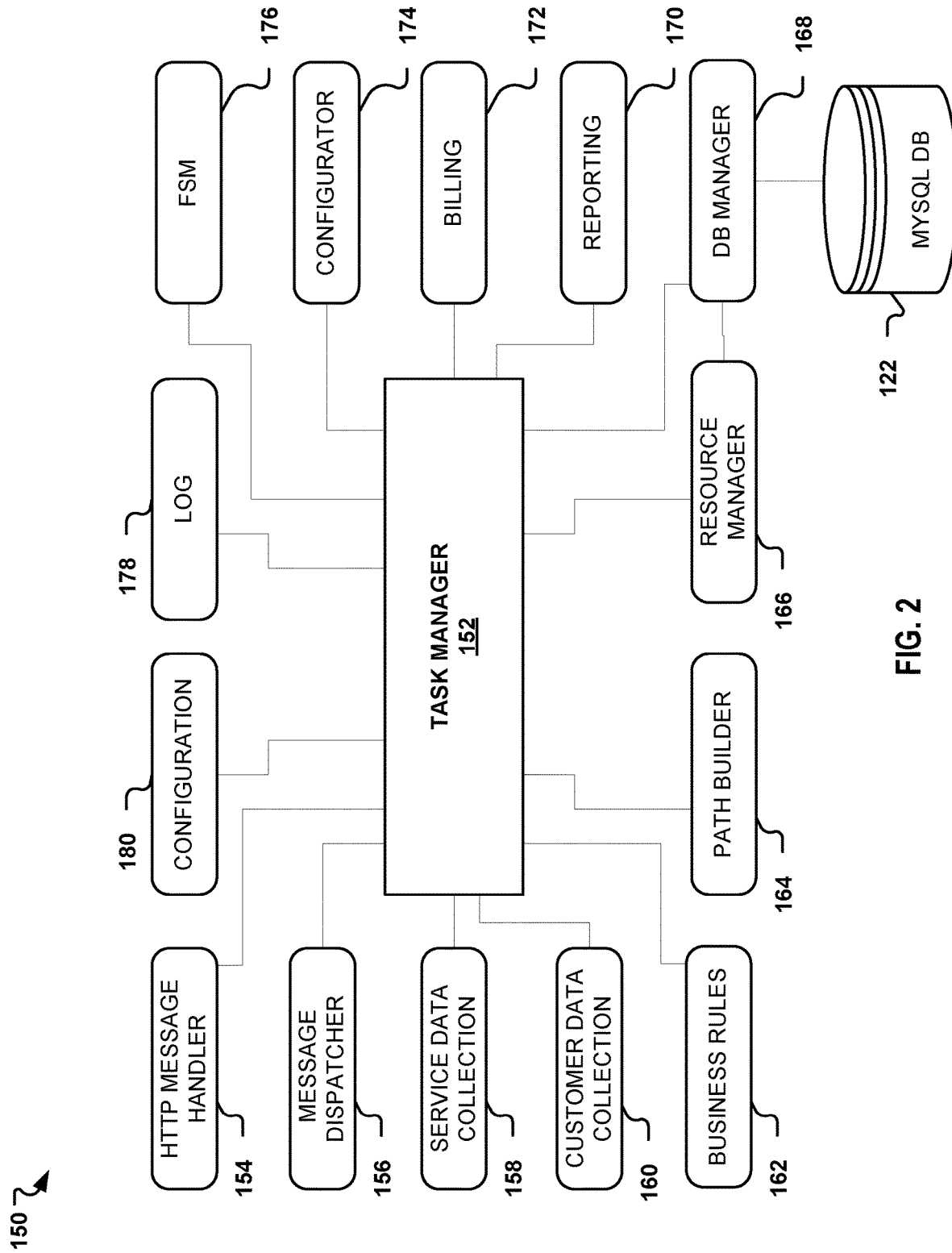
FIG. 2 is a diagram depicting exemplary components or modules of a dynamic controller, according to aspects of the present disclosure.

Implementation of the dynamic controller 102 of FIGS. 1 and 2 to generate a network connection path 200 will now be discussed in greater detail using a process flow 400 illustrated in FIG. 4 with reference to the example network path illustrated in FIG. 3A. The process flow 400 or other similar process flows may also be utilized to generate other connection paths such as the connection paths 200B-200D of FIGS. 3B-3D to establish a network connection or otherwise provision some type of telecommunications service. In addition, generating the connection path 200 is not limited to the features of process flow 400 and additional features are contemplated.

Figure 4:
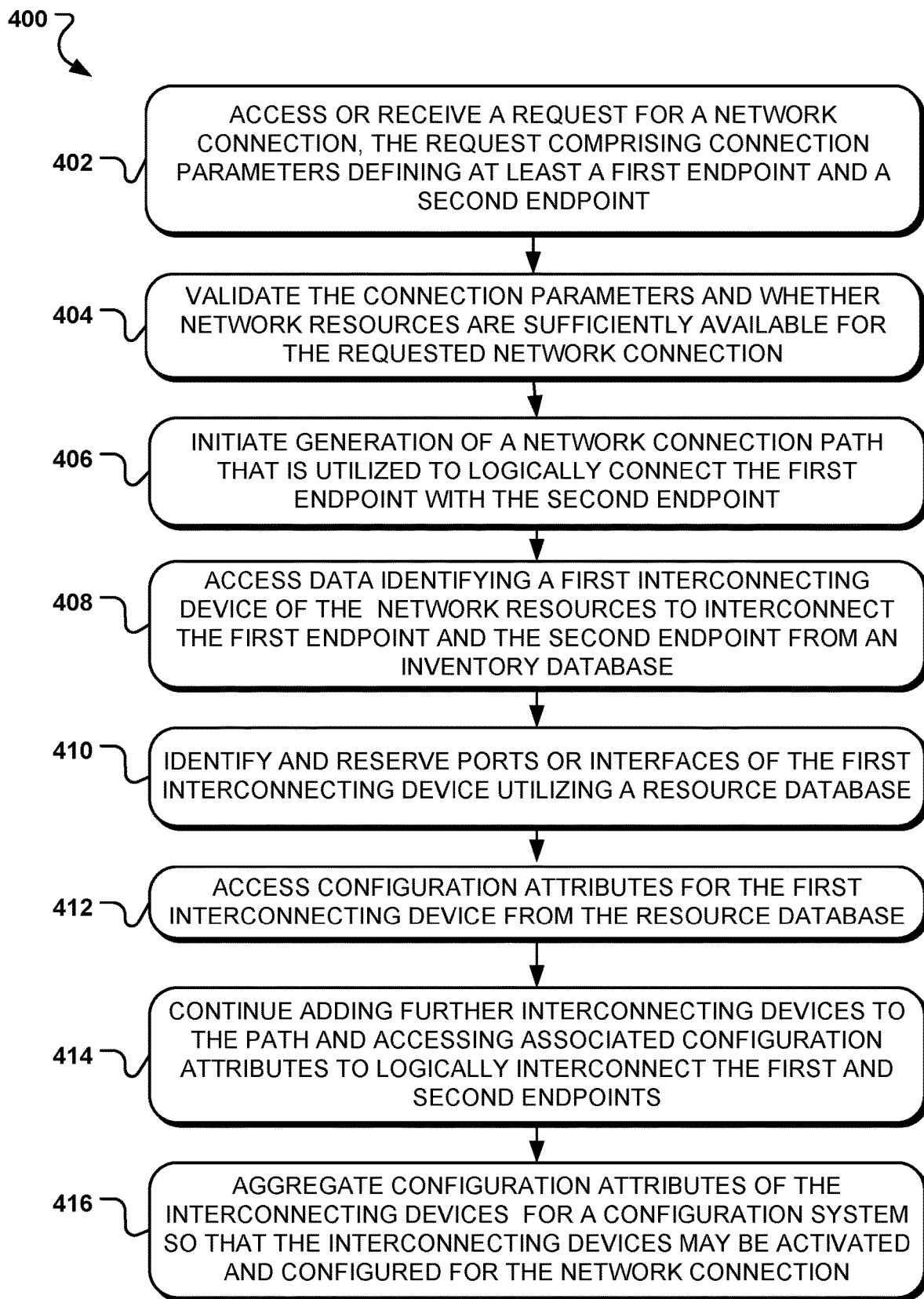
FIG. 4 is an exemplary process flow for managing requests to provision network connections between devices using the dynamic controller as disclosed, according to aspects of the present disclosure.

In block 402 of FIG. 4, the dynamic controller 102 receives a request for a new network connection. Specifically, referencing FIG. 3A, the request comprises a digital communication defining a desired network connection from a first endpoint, the UNI 1 220 of the NID 210, to a second endpoint, a second user network interface (UNI 2) 250. The UNI 1 220 defines a port or interface associated with the NID 210, and the UNI 2 250 defines a port or interface associated with another network device. The request may originate from the customer computing device 204, and may be transmitted to the dynamic controller 102 in the form of a call through the API 106, or may be created using the portal 108 which is accessible by the dynamic controller 102. With the portal 108, a customer or other user may log in to the same using a web browser or other similar interface. The portal 108 may provide any number of input features such as drop down menus, selectable lists, windows, and other features for the customer to initiate the request and define the specific requested network connection.

In one embodiment, the API 106 may comprise a representational state transfer (REST) API. As such, the API 106 may utilize the REST architecture to manage requests. The API 106 may further implement hypertext transfer protocol (HTTP) POST methods which include methods supported by the HTTP protocol and which may further include asynchronous calls. A graphical user interface (GUI) may be built on top of the framework of the API 106 or be integrated within the portal 108. For example, a customer may submit a request using graphical drop down boxes, bullets, or other graphical input features and the request may be translated to an API 106 call and transmitted or otherwise made accessible to the dynamic controller 102. In other words, for example, the portal 108 may comprise a graphical user interface (GUI) accessible by the customer computing device 204, with the API 106 integrated with the portal 108. As a user interacts with the portal 108, the API 106 is implemented in some form to pass communications to and from the dynamic controller 102 and the customer computing device 204. For example, where the customer submits a request using the portal 108, a call, containing the data of the request generated at the portal 108, is generated by the API 106 and submitted to the dynamic controller 102 to provide the information of the request to the dynamic controller 102.

The request may define a specific desired network connection using a plurality of connection parameters which may comprise, by non-limiting examples: a first endpoint identifier, a second endpoint identifier, a request identifier, a user email identifier, an account number identifier, a bandwidth identifier, a class of service (COS) identifier, and one or more VLAN identifiers. In some embodiments, the request may further include an identifier for cloud services. The connection parameters provide information utilized by the dynamic controller 102 to generate a connection path and are ultimately used to provision a network connection or telecommunications service that is specific to the preferences of a customer. For example, where a customer submits a request for a new network connection with a bandwidth identifier of "100 Megabits per second (Mbps)," the dynamic controller 102 utilizes such information to generate a specific connection path (e.g., by configuring devices in the path) that can meet the bandwidth of 100 Mbps for that desired network connection, as described herein. In some embodiments, the request and connection parameters may be encoded in JavaScript Object Notation (JSON) and received by the dynamic controller 102 in an HTTP POST request body. In this implementation, the first endpoint identifier and the second endpoint identifier may be encoded within the HTTP POST request body as JSON objects, and the request identifier, user email identifier, account number identifier, bandwidth identifier, and class of service (COS) identifier may be encoded as strings within the HTTP POST request body. It should be understood that a request may be encoded in alternate formats or accessed using other similar methods. Additional connection parameters are also contemplated. For example, in some embodiments, the request may define a third endpoint identifier such that the request defines a multi-point connection from the first endpoint identifier to the second and third endpoint identifiers, and the like.

The first endpoint identifier may define a first logical connection point for the requested network connection of block 402. In some embodiments, the first endpoint identifier may be embodied as a JSON object that defines sub-parameters (of the connection parameters) for the first endpoint identifier. Such sub-parameters may include by non-limiting example: a first UNI identifier, a VLAN identifier, and/or a cloud service identifier. Referencing FIG. 3A, the first UNI identifier may uniquely identify the UNI 1 220 or other type of network interface associated with the NID 210.

The second endpoint identifier may define a second logical connection point for the desired network connection associated with the request of block 402. Specifically, the second endpoint identifier may be embodied as a JSON object that defines sub-parameters (of the connection parameters) for the second logical connection point. Such sub-parameters may include by non-limiting example: a second UNI identifier, a VLAN identifier, and/or a cloud service identifier. The second UNI identifier may uniquely identify a second UNI or other type of network interface for connection to the UNI 1 220 defined by the first UNI identifier. Referencing FIG. 3A, the second UNI identifier defines the UNI 2 250. In some embodiments, UNI 1 220 may be associated with a customer of a service provider and UNI 2 250 may be associated with another device of the same customer. Alternatively, the UNI 2 250 may be associated with any number of devices needed for a customer to access some service by way of a path to UNI 1 220.

The first and second endpoint identifiers for the network connection may be selected for the connection parameters of the request in a variety of different ways. Where a customer lacks yet desires information about both the first endpoint identifier and the second endpoint identifier for the request, a query may be transmitted from the customer computing device 204 to the dynamic controller 102. The customer query may include a customer account number as well as other attributes concerning the requested service, path, etc. The dynamic controller may then query one of the discussed databases, and return possible interfaces for both the first endpoint identifier and the second endpoint identifier. The dynamic controller 102 may return a response to the customer computing device 204 using the API 106 or portal 108 with a list of possible interfaces for the first endpoint identifier and the second endpoint identifier. In some cases, the customer may already know or have knowledge regarding the first UNI identifier defined by the first endpoint identifier for the request, such as the UNI 1 220 of FIG. 3A, yet, the customer may be unaware of possible interfaces for the second endpoint identifier (possible connection points for the UNI 1 220). As such, the customer may utilize the customer computing device 204 to transmit a query to the dynamic controller 102 with reference to the customer account number and the UNI 1 220 to access a list of possible interfaces available for connection with the UNI 1 220. In either case, the dynamic controller 102 takes into account the customer's account and any limitations or restrictions associated with customer devices such as the NID 210. The dynamic controller 102 may also provide available connection points for the UNI 1 220 of the NID 210 based on a specific type of connection desired by a customer. For example, a customer may submit a query to the dynamic controller 102 to inquire about cloud service interfaces available for connection to the UNI 1 220 of the NID 210 in order to extend a cloud service to the NID 210. In response, the dynamic controller 102 may query the databases 120 to determine whether any one or more cloud service interfaces are available for connection to the UNI 1 220 of the NID 210 and return such information to the customer (using the API 106 and/or portal 108) as possible second endpoint identifiers.

The VLAN identifier (or VLAN identifiers) of the connection parameters disclosed involves a VLAN (or multiple VLANs). A VLAN comprises a network of logically connected devices. VLAN tagging may be utilized to direct network traffic associated with a VLAN through a telecommunications network, or more specifically, through a particular network connection path such as the connection path 200 of FIG. 3A. For example, a VLAN identifier may be inserted into a packet header, and networking devices associated with a telecommunications network, such as the NID 210, may be configured to interpret which VLAN the packet belongs to and how the packet should be routed as the packet ingresses into and traverses the telecommunications network. The VLAN identifier of the request of FIG. 4 may comprise one or more customer VLAN identification numbers so that customers can specify that network traffic associated with those VLANs should utilize, be routed through, or otherwise have access to a network connection path to be generated in response to a request for a network connection. For example, referencing FIG. 3A, a customer may submit the request to generate a network connection associated with the connection path 200 where the request specifies a VLAN identifier value of VLAN 10. In this case, network traffic may ingress to the telecommunications network from the NID 210. When the network connection path 200 of FIG. 3A is ultimately generated, using the VLAN identifier of VLAN 10 submitted within the request, the NID 210 may be configured by the dynamic controller 102 to route traffic with the VLAN identifier of VLAN 10 through the network connection path 200 of FIG. 3A as described herein.

The request identifier of the connection parameters may be assigned to the request to distinguish the request from other requests, to retrieve information about network connection paths associated with the request, and for troubleshooting purposes and the like as described herein. For example, where the request fails or is denied by the dynamic controller 102 for whatever reason, the dynamic controller 102 may transmit a message back to the customer computing device 204 referencing the request by its request identifier value. The API 106 may generate a value for the request identifier automatically when a request is first accessed or the value for the request identifier may be specified by a customer interacting with the customer computing device 204.

The user email identifier of the connection parameters may comprise an email address of a customer or other user of the dynamic controller 102. The dynamic controller 102 may issue email notifications using the user email identifier to provide various status updates associated with a request, such as an email update that the request has been received and a network connection defined by the request has been created. The account number identifier may be used for billing 124, reporting 126, and validations (as to whether customer devices associated with a particular account number have access to or can technically support the network connection requested). The bandwidth identifier may define a requested bandwidth in bits per second (bps), Megabits per second (Mbps), or Gigabits per second (Gbps) for the desired network connection associated with the request. The COS identifier may define a requested class of service for the connection. For example, the request may include a value for the COS identifier of "BASIC," "ENHANCED," or "DEDICATED" which may assist the dynamic controller 102 to implement predetermined network resources and generate a network connection path that meets the COS defined by the COS identifier.

Exemplary content of a call that may be issued by the API 106 to the dynamic controller 102, defining the connection parameters of a request of block 402 to generate the connection path 200, may be represented as:

```
{
   "userEmail": "user@company.com"
   "accountNumber": "12345",
   "bandwidth": "100 Mbps",
   "cos": "Basic",
   "endPoint1":
      {
         "uniID": "UNI 1 220",
         "ceVlan": "11"
      },
      "endPoint2":
      {
         "uniID": "UNI 2 250",
         "ceVlan": "11"
      }
}
```

Describing the above example with reference to FIG. 3A, it can be seen that the exemplary call reflects connection parameters of the request with: a user email identifier value of "user@company.com", an account number identifier value of "12345," a bandwidth identifier value of "100 Mbps", and a COS identifier value of "Basic." In addition, it can be seen that the exemplary call reflects a first endpoint identifier associated with the first UNI identifier of "UNI 1 220," and a second endpoint identifier associated with the second UNI identifier of "UNI 2 250," which defines a desired network connection between the UNI 1 220 and the UNI 2 250 of FIG. 3A. Such an exemplary call may be implemented with the dynamic controller 102 to generate the connection path 200. Further, the exemplary call reflects a VLAN identifier (ceVLAN) for each of the first UNI identifier and the second UNI identifier as "11." This instructs the dynamic controller 102 to configure devices of the network connection path 200 to route network traffic with a VLAN tag of "11" through the path 200, as described herein. The aforementioned information of the exemplary call may be transmitted to the dynamic controller 102 using the portal 108 and/or the API 106 from the customer computing device 204.

Continuing with FIG. 4, block 404 deals with validation of the request to generate a network connection between the UNI 1 220 and the UNI 2 250 by the dynamic controller 102. The dynamic controller 102 validates the individual connection parameters of the request, and, if the connection parameters are valid, the dynamic controller 102 initially determines whether the connection path 200 can be generated using the specific values associated with the connection parameters, taking into account whether network resources 130 are sufficiently available for the desired network connection (as defined by the connection parameters). Specifically for example, referencing the connection parameters, the dynamic controller 102 may initiate a query to the inventory database 120A to verify that there are possible network resources 130 that are accessible and can technically support a new connection from the UNI 1 220 to the UNI 2 250, where, as demonstrated above, the connection requires a bandwidth of 100 Mbps. Referencing the example of FIG. 3A, the inventory database 120A may return a list of possible network resources 130 which may include a device 222, a device 226, a provider edge (PE) 1 device 228, a PE 2 device 232, a device 236, and a device 242. Validation may fail in this example where no network resources 130 are accessible to the UNI 1 220 and the UNI 2 250 or where network resources 130 are lacking that support a network connection with a bandwidth of 100 Mbps.

Validation by the dynamic controller 102 may further comprise applying one or more rules to the request. An account, associated with the account number identifier, may be limited by a rule that restricts the number and type of connections that can be generated for that account. Referencing FIG. 3A and the exemplary call above, the dynamic controller 102 may initiate a query to a database to verify that the account associated with the account number of "12345" is not limited by any rules that would prohibit or otherwise not authorize a connection from the UNI 1 220 to the UNI 2 250. Validation by the dynamic controller 102 is not limited to the above features and additional such examples are contemplated.

Upon such initial validation of the request, the dynamic controller 102 may generate some form of a notification for the customer computing device 204, or issue a message that the request has been initially validated such that a build of the network connection can commence. Specifically, in one example, the dynamic controller 102 may return an HTTP response to the customer computing device 204 to confirm receipt and initial validation of the request. Additional validation steps by the dynamic controller 102 are contemplated as described herein.

As indicated in block 406 of FIG. 4, the dynamic controller 102 may initiate the generation of a connection path, such as the connection path 200, which may be utilized to provision a network connection between two endpoints. A connection path may be virtual in nature, in other words, a connection path may define a virtual or logical design for logically interconnecting the endpoints using one or more of the network resources 130 as interconnecting devices. As such, a connection path may be generated, or built, within a memory or storage device integrated with or otherwise accessible to the dynamic controller 102. The connection path may be implemented when endpoints are not directly accessible to one another due to network limitations associated with distance or where the endpoints are deployed in different networks. Generating the connection path 200 by the dynamic controller 102 may involve referencing the databases 120 in view of the connection parameters to intelligently select or assign certain network resources 130 to the connection path 200 for interconnecting endpoints, while also accessing configuration attributes about the network resources 130 of the connection path. The dynamic controller 102 ultimately utilizes the connection path 200 in combination with the configuration attributes to define and essentially pre-generate the requested network connection for the NSO system 114, as described herein.

Illustrating further, as indicated in block 408, the dynamic controller 102 may reference the databases 120 in view of one or more of the connection parameters of the above request to sequentially build the connection path 200, highlighted in bold in FIG. 3A. The dynamic controller 102 may build the path 200 starting from either of the endpoints shown such as the UNI 1 220 or the UNI 2 250; and in some embodiments, the dynamic controller 102 may build the path 200 from both endpoints simultaneously. As one example, with reference to FIG. 3A, generating the connection path 200 may initially involve the UNI 1 220, or the first endpoint. In this case, the dynamic controller 102 may first query the resource database 120B referencing a device or circuit identifier associated with the NID 210, to verify that the UNI 1 220 is available for use by the network connection. Assuming data of the resource database 120B reflects that the UNI 1 220 is in fact available for the network connection requested, the dynamic controller 102 may then update data within the resource database 120B to designate the UNI 1 220 of the NID 210 as being reserved for the subject network connection, including any details as necessary about the type of network connection requested.

The dynamic controller 102 further accesses or retrieves a set of configuration attributes about the UNI 1 220 and the NID 210 from the resource database 120B. The configuration attributes define the information needed to configure and activate the UNI 1 220 and the NID 210 for the connection path 200 to be able to implement the network connection requested. Configuration attributes accessed by the dynamic controller 102 may include, by non-liming examples: a committed information rate, a P-Bit identifier associated with the COS, a buffer size, an interconnecting device description, an S-VLAN ID, a burst size, a bridge group, a MAC address, a flow identifier, an interface identifier, and the like. However, the dynamic controller 102 may access any number and type of different configuration attributes when the connection path 200 involves different types of the network resources 130. For example, configuration of a switch by Cisco Systems to provision a network connection may involve a first set of configuration attributes, whereas configuration of a switch by Dell Networking may involve a second set of configuration attributes different from the first set. Different networking devices may also utilize different communication protocols, in other words, command language to communicate with the switch by Cisco Systems may be different than command language for the Dell Networking switch.

The dynamic controller 102 is operable to extract the specific configuration attributes needed to ultimately configure the NID 210 for the network connection requested in block 402, based on the type of NID 210 and the connection parameters of the request, and stores such information temporarily in the memory of the dynamic controller 102. The configuration attributes may eventually be applied to the NID 210 to, for example, configure the UNI 1 220 according to the connection parameters of the request, and to configure the UNI 1 220 of the NID 210 to route traffic associated with a particular VLAN ID, such as a VLAN of "11", as defined by the connection parameters of the request, and the like.

Once the configuration attributes are accessed for the UNI 1 220 and the resource database 120B is updated to preserve the UNI 1 220 for the requested network connection, the dynamic controller 102 may begin generating the connection path 200 using a plurality of interconnecting devices. Generating the connection path 200 from the UNI 1 220 may involve assigning a first interconnecting device, the device 222, to the connection path 200 that may be ultimately connected to the UNI 1 220 to generate the desired network connection, as described herein. Assigning the device 222 to the connection path 200 may define a first portion 200A of the connection path 200. The device 222 may be one of the network resources 130, and may define a drop node for the connection path 200, associated with a metro ring, designated Metro 1 224. The device 222 is intelligently selected by the dynamic controller 102 as the first interconnecting device for the connection path 200 by referencing the databases 120 in view of the connection parameters.

More specifically, the dynamic controller 102 may identify the device 222 as a first interconnecting device of the path 200 by first executing a query to the inventory database 120A, with reference to the UNI 1 220 and one or more of the connection parameters of the request. By referencing the UNI 1 220, the dynamic controller 102 identifies network resources such as the device 222 that are specifically accessible to the UNI 1 220 of the NID 210 in some form; in other words, the inventory database 120A may define that the device 222 is deployed within a particular geographical area such that the device 222 is accessible to the NID 210, that the device 222 is a network resource 130 that is compatible with the UNI 1 220 and the NID 210, and the like. For example, the inventory database 120A may track physical addresses associated with both the NID 210 and the device 222 which the dynamic controller 102 can use to determine if the devices are in close enough proximity to one another to be connected without other intermediate devices. By referencing the connection parameters, the dynamic controller 102 limits selection of network resources 130 returned by the inventory database 120A to resources such as the device 222 that can actually support the specific network connection defined by the request. To illustrate, continuing the earlier example of block 402, the connection parameters of the request may include a bandwidth identifier with a specific value of 100 Megabits per second (Mbps). The dynamic controller 102 may reference this bandwidth value when querying the inventory database 120A and selects the device 222 from the network resources 130 where the device 222 is capable of being implemented to provide a network connection between the UNI 1 220 and the UNI 2 250 with a bandwidth of 100 Mbps.

As indicated in block 410, before assigning the device 222 to the connection path 200, the dynamic controller 102 may also query the resource database 120B referencing a device identifier associated with the device 222. By referencing the resource database 120B with the device identifier associated with the device 222, the dynamic controller 102 identifies available ports or interfaces of the device 222, as defined in the resource database 120B, that may be reserved by the dynamic controller 102 and eventually configured specifically for the network connection. The dynamic controller 102 may then select a particular port or interface of the device 222 where available, and update data within the resource database 120B to designate that selected port or interface of the device 222 as being reserved for the subject network connection. This way, the dynamic controller 102 manages and tracks the implementation of the network resources 130 such as the device 222 by updating and referencing the implementation of the network resources 130 within the resource database 120B. In the case where no ports or interfaces are available at the device 222, the dynamic controller 102 may re-query the inventory database 120A for other suitable network resources and if no further resources are available, may communicate an error message to the customer computing device 204 indicating that the requested network connection cannot be provisioned.

Referencing block 412, as the dynamic controller selects the device 222 as the first interconnecting device of the connection path 200, the dynamic controller 102 further accesses or retrieves a set of configuration attributes about the device 222 from the resource database 120B. The dynamic controller 102 is operable to extract the specific configuration attributes needed to ultimately configure the device 222 for the network connection requested in block 402, based on the type of device 222 and the connection parameters of the request, and stores such information temporarily in the memory of the dynamic controller 102. The configuration attributes may eventually be applied to the device 222 to, for example, configure a port or interface of the device 222 according to the connection parameters of the request, to configure a port or interface of the device 222 to route traffic associated with a particular VLAN ID as defined by the connection parameters of the request, and the like. In some embodiments, the dynamic controller 102 accesses such configuration attributes for the device 222 simultaneously as the device 222 is being added to the connection path 200 in memory of the dynamic controller 102.

As described in block 414, the dynamic controller 102 continues to add additional interconnecting devices to the connection path 200 to logically connect the UNI 1 220 to the UNI 2 250 using the same or similar steps described in blocks 408-412. More specifically, the dynamic controller 102 may assign a second interconnecting device, the device 226, to the connection path 200 that may be ultimately connected to the device 222 to generate the desired network connection, as described herein. Assigning the device 226 to the connection path 200 may define a second portion 200B of the connection path 200. The device 226 may be one of the network resources 130, and may define an aggregator node for the connection path 200, associated with the Metro 1 224. The device 226 is intelligently selected by the dynamic controller 102 as the second interconnecting device for the connection path 200 by referencing the databases 120 in view of the connection parameters.

More specifically, the dynamic controller 102 may identify the device 226 as a second interconnecting device of the path 200 by executing another query to the inventory database 120A, with reference to the device 222 and one or more of the connection parameters of the request. By referencing the device 222, the dynamic controller 102 identifies network resources such as the device 226 that are specifically accessible to the device 222 in some form; in other words, the inventory database 120A may define that the device 226 is deployed within a particular geographical area such that the device 226 is accessible to the device 222, that the device 226 is a network resource 130 that is compatible with the device 222, and the like. By referencing the connection parameters, the dynamic controller 102 limits selection of network resources 130 returned by the inventory database 120A to resources such as the device 226 that can actually support the specific network connection defined by the request. To illustrate, continuing the earlier example of block 402, the dynamic controller 102 may utilize the inventory database 120A to confirm that the device 226 can support a connection of 100 Mbps as defined in the connection parameters of the request.

Before assigning the device 226 to the connection path 200, the dynamic controller 102 may again query the resource database 120B referencing a device identifier associated with the device 226. By referencing the resource database 120B with the device identifier associated with the device 226, the dynamic controller 102 identifies available ports or interfaces of the device 226, as defined in the resource database 120B, that may be reserved by the dynamic controller 102 and eventually configured specifically for the network connection. The dynamic controller 102 may then select a particular port or interface of the device 226 where available, and update data within the resource database 120B to designate the selected port or interface of the device 226 as being reserved for the subject network connection. This way, the dynamic controller 102 continues to manage and track the implementation of the network resources 130 such as the device 226 by updating and referencing the implementation of the network resources 130 within the resource database 120B. In the case where no ports or interfaces are available at the device 226, the dynamic controller 102 may re-query the inventory database 120A for other suitable network resources to connect to the device 222 and if no further resources are available, may communicate an error message to the customer computing device 204 indicating that the requested network connection cannot be provisioned.

As the dynamic controller selects the device 226 as the second interconnecting device of the connection path 200, the dynamic controller 102 further accesses or retrieves a set of configuration attributes about the device 226 from the resource database 120B. The dynamic controller 102 is operable to extract the specific configuration attributes needed to ultimately configure the device 226 for the network connection requested in block 402, based on the type of device 226 and the connection parameters of the request, and stores such information temporarily in the memory of the dynamic controller 102. The configuration attributes may eventually be applied to the device 226 to, for example, configure a port or interface of the device 226 according to the connection parameters of the request, to configure a port or interface of the device 226 to route traffic associated with a particular VLAN ID as defined by the connection parameters of the request, and the like. In some embodiments, the dynamic controller 102 accesses such configuration attributes for the device 226 simultaneously as the device 226 is being added to the connection path 200 in memory of the dynamic controller 102.

The dynamic controller 102 may continue defining the path 200 by adding a third interconnecting device, the PE 1 device 228, to the connection path 200 that may be ultimately connected to the device 226 to generate the desired network connection, as described herein. The PE 1 device 228 may be one of the network resources 130 and may comprise a provider edge networking device; in other words, a networking device deployed at an edge of a service provider's core network 230. Assigning the PE 1 device 228 to the connection path 200 may define a third portion 200C of the connection path 200. The PE 1 device 228 is intelligently selected by the dynamic controller 102 as the third interconnecting device for the connection path 200 by referencing the databases 120 in view of the connection parameters.

More specifically, the dynamic controller 102 may identify the PE 1 device 228 as a third interconnecting device of the path 200 by executing another query to the inventory database 120A, with reference to the device 226 and one or more of the connection parameters of the request. By referencing the device 226, the dynamic controller 102 identifies network resources such as the PE 1 device 228 that are specifically accessible to the device 226 in some form; in other words, the inventory database 120A may define that the PE 1 device 228 is deployed within a particular geographical area such that the PE 1 device 228 is accessible to the device 226, that the PE 1 device 228 is compatible with the device 226, and the like. By referencing the connection parameters, the dynamic controller 102 limits selection of the third interconnecting device to the PE 1 device 228 that can actually support the specific network connection defined by the request. To illustrate, continuing the earlier example of block 402, the dynamic controller 102 may utilize the inventory database 120A to confirm that the PE 1 device 228 can support a connection of 100 Mbps as defined in the connection parameters of the request.

Before assigning the PE 1 device 228 to the connection path 200, the dynamic controller 102 may again query the resource database 120B referencing a device identifier associated with the PE 1 device 228. By referencing the resource database 120B with the device identifier associated with the PE 1 device 228, the dynamic controller 102 identifies available ports or interfaces of the PE 1 device 228, as defined in the resource database 120B, that may be reserved by the dynamic controller 102 and eventually configured specifically for the network connection. The dynamic controller 102 may then select a particular port or interface of the PE 1 device 228 where available, and update data within the resource database 120B to designate that selected port or interface of the PE 1 device 228 as being reserved for the subject network connection. This way, the dynamic controller 102 continues to manage and track the implementation of the network resources 130 by updating and referencing the implementation of the network resources 130 within the resource database 120B. In the case where no ports or interfaces are available at the PE 1 device 228, the dynamic controller 102 may re-query the inventory database 120A for other suitable network resources to connect to the device 226 and if no further resources are available, may communicate an error message to the customer computing device 204 indicating that the requested network connection cannot be provisioned.

As the dynamic controller selects the PE 1 device 228 as the third interconnecting device of the connection path 200, the dynamic controller 102 further accesses or retrieves a set of configuration attributes about the PE 1 device 228 from the resource database 120B. The dynamic controller 102 is operable to extract the specific configuration attributes needed to ultimately configure the PE 1 device 228 for the network connection requested in block 402, based on the type of PE 1 device 228 and the connection parameters of the request, and stores such information temporarily in the memory of the dynamic controller 102. The configuration attributes may eventually be applied to the PE 1 device 228 to, for example, configure a port or interface of the PE 1 device 228 according to the connection parameters of the request, to configure a port or interface of the PE 1 device 228 to route traffic associated with a particular VLAN ID as defined by the connection parameters of the request, and the like. In some embodiments, the dynamic controller 102 accesses such configuration attributes for the PE 1 device 228 simultaneously as the PE 1 device 228 is being added to the connection path 200 in memory of the dynamic controller 102.

The dynamic controller 102 may continue defining the path 200 by adding a fourth interconnecting device, a PE 2 device 232, to the connection path 200 that may be ultimately connected to the PE 1 device 228 to generate the desired network connection, as described herein. The PE 2 device 232 may be one of the network resources 130 and may comprise another provider edge networking device; in other words, a networking device deployed at another edge of the service provider's core network 230 opposite to, or at another edge of the core network 230 as compared with where the PE 1 device 228 is deployed. The core network 230 may comprise a plurality of previously interconnected networking devices of a service provider. The core network 230 may be pre-configured to facilitate the routing of network traffic from one edge of the core network 230 to another without the need by the dynamic controller 102 to assist with configurations of the interconnected networking devices of the core network 230. Assigning the PE 2 device 232 to the connection path 200 may define a fourth portion 200D of the connection path 200, which passes through the core network 230 from the PE 1 device 228 to the PE 2 device 232.

The dynamic controller 102 may identify the PE 2 device 232 as the fourth interconnecting device of the path 200 by executing another query to the inventory database 120A, with reference to the PE 1 device 228 and one or more of the connection parameters of the request. By referencing the PE 1 device 228, the dynamic controller 102 identifies network resources such as the PE 2 device 232 that are accessible to the PE 1 device 228 in some form; in other words, the inventory database 120A may define that the PE 2 device 232 is deployed within a particular geographical area such that the PE 2 232 is accessible to the PE 1 device 228, that the PE 2 device 232 is compatible with the PE 1 device 228, and the like. By referencing the connection parameters, the dynamic controller 102 limits selection of the fourth interconnecting device to the PE 2 device 232 that can actually support the specific network connection defined by the request. To illustrate, continuing the earlier example of block 402, the dynamic controller 102 may utilize the inventory database 120A to confirm that the PE 2 device 232 can support a connection of 100 Mbps as defined in the connection parameters of the request.

Before assigning the PE 2 device 232 to the connection path 200, the dynamic controller 102 may again query the resource database 120B referencing a device identifier associated with the PE 2 device 232. By referencing the resource database 120B with the device identifier associated with the PE 2 device 232, the dynamic controller 102 identifies available ports or interfaces of the PE 2 device 232, as defined in the resource database 120B, that may be reserved by the dynamic controller 102 and eventually configured specifically for the network connection. The dynamic controller 102 may then select a particular port or interface of the PE 2 device 232 where available, and update data within the resource database 120B to designate that port or interface of the PE 2 device 232 as being reserved for the subject network connection. In the case where no ports or interfaces are available at the PE 2 device 232, the dynamic controller 102 may re-query the inventory database 120A for other suitable network resources to connect to the PE 1 device 228 and if no further resources are available, may communicate an error message to the customer computing device 204 indicating that the requested network connection cannot be provisioned.

As the dynamic controller selects the PE 2 device 232 as the fourth interconnecting device of the connection path 200, the dynamic controller 102 further accesses or retrieves a set of configuration attributes about the PE 2 device 232 from the resource database 120B. The dynamic controller 102 is operable to extract the specific configuration attributes needed to ultimately configure the PE 2 device 232 for the network connection requested in block 402, based on the type of PE 2 device 232 and the connection parameters of the request, and stores such information temporarily in the memory of the dynamic controller 102. The configuration attributes may eventually be applied to the PE 2 device 232 to, for example, configure a port or interface of the PE 2 device 232 according to the connection parameters of the request, to configure a port or interface of the PE 2 device 232 to route traffic associated with a particular VLAN ID as defined by the connection parameters of the request, and the like. In some embodiments, the dynamic controller 102 accesses such configuration attributes for the PE 2 device 232 simultaneously as the PE 2 device 232 is being added to the connection path 200 in memory of the dynamic controller 102.

The dynamic controller 102 may continue defining the path 200 by adding a fifth interconnecting device, the device 236, to the connection path 200 that may be ultimately connected to the PE 2 device 232 to generate the desired network connection, as described herein. The device 236 may be associated with another metro ring designated Metro 2 240, may comprise one of the network resources 130, and assigning the device 236 to the connection path 200 may define a fifth portion 200E of the connection path 200. The device 236 is intelligently selected by the dynamic controller 102 as the fifth interconnecting device for the connection path 200 by referencing the databases 120 in view of the connection parameters.

More specifically, the dynamic controller 102 may identify the device 236 as the fifth interconnecting device of the path 200 by executing another query to the inventory database 120A, with reference to the PE 2 device 232 and one or more of the connection parameters of the request. By referencing the PE 2 device 232, the dynamic controller 102 identifies network resources such as the device 236 that are specifically accessible to the PE 2 device 232 in some form; in other words, the inventory database 120A may define that the device 236 is deployed within a particular geographical area such that the device 236 is accessible to the PE 2 device 232, that the PE 2 device 232 is compatible with the device 236, and the like. By referencing the connection parameters, the dynamic controller 102 limits selection of the fifth interconnecting device to the device 236 that can actually support the specific network connection defined by the request. To illustrate, continuing the earlier example of block 402, the dynamic controller 102 may utilize the inventory database 120A to confirm that the device 236 can support a connection of 100 Mbps as defined in the connection parameters of the request.

Before assigning the device 236 to the connection path 200, the dynamic controller 102 may again query the resource database 120B referencing a device identifier associated with the device 236. By referencing the resource database 120B with the device identifier associated with the device 236, the dynamic controller 102 identifies available ports or interfaces of the device 236, as defined in the resource database 120B, that may be reserved by the dynamic controller 102 and eventually configured specifically for the network connection. The dynamic controller 102 may then select a particular port or interface of the device 236 where available, and update data within the resource database 120B to designate that selected port or interface of the device 236 as being reserved for the subject network connection. This way, the dynamic controller 102 continues to manage and track the implementation of the network resources 130 by updating and referencing the implementation of the network resources 130 within the resource database 120B. In the case where no ports or interfaces are available at the device 236, the dynamic controller 102 may re-query the inventory database 120A for other suitable network resources to connect to the PE 2 device 232 and if no further resources are available, may communicate an error message to the customer computing device 204 indicating that the requested network connection cannot be provisioned.

As the dynamic controller selects the device 236 as the fifth interconnecting device of the connection path 200, the dynamic controller 102 further accesses or retrieves a set of configuration attributes about the device 236 from the resource database 120B. The dynamic controller 102 is operable to extract the specific configuration attributes needed to ultimately configure the device 236 for the network connection requested in block 402, based on the type of device 236 and the connection parameters of the request, and stores such information temporarily in the memory of the dynamic controller 102. The configuration attributes may eventually be applied to the device 236 to, for example, configure a port or interface of the device 236 according to the connection parameters of the request, to configure a port or interface of the device 236 to route traffic associated with a particular VLAN ID as defined by the connection parameters of the request, and the like. In some embodiments, the dynamic controller 102 accesses such configuration attributes for the device 236 simultaneously as the device 236 is being added to the connection path 200 in memory of the dynamic controller 102.

The dynamic controller 102 may continue defining the path 200 by adding a sixth interconnecting device, the device 242, to the connection path 200 that may be ultimately connected to the PE 2 device 232 to generate the desired network connection, as described herein. The device 242 may be associated with the Metro 2 240, and may comprise one of the network resources 130. Assigning the device 242 to the connection path 200 may define a sixth portion 200F of the connection path 200. The device 242 is intelligently selected by the dynamic controller 102 as the sixth interconnecting device for the connection path 200 by referencing the databases 120 in view of the connection parameters.

More specifically, the dynamic controller 102 may identify the device 242 as the sixth interconnecting device of the path 200 by executing another query to the inventory database 120A, with reference to the device 236 and one or more of the connection parameters of the request. By referencing the device 236, the dynamic controller 102 identifies network resources such as the device 242 that are specifically accessible to the device 236 in some form; in other words, the inventory database 120A may define that the device 242 is deployed within a particular geographical area such that the device 242 is accessible to the device 236, that the device 242 is compatible with the device 236, and the like. By referencing the connection parameters, the dynamic controller 102 limits selection of the sixth interconnecting device to the device 242 that can actually support the specific network connection defined by the request. To illustrate, continuing the earlier example of block 402, the dynamic controller 102 may utilize the inventory database 120A to confirm that the device 242 can support a connection of 100 Mbps as defined in the connection parameters of the request.

Before assigning the device 242 to the connection path 200, the dynamic controller 102 may again query the resource database 120B referencing a device identifier associated with the device 242. By referencing the resource database 120B with the device identifier associated with the device 242, the dynamic controller 102 identifies available ports or interfaces of the device 242, as defined in the resource database 120B, that may be reserved by the dynamic controller 102 and eventually configured specifically for the network connection. The dynamic controller 102 may then select a particular port or interface of the device 242 where available, and update data within the resource database 120B to designate that selected port or interface of the device 242 as being reserved for the subject network connection. This way, the dynamic controller 102 continues to manage and track the implementation of the network resources 130 by updating and referencing the implementation of the network resources 130 within the resource database 120B. In the case where no ports or interfaces are available at the device 242, the dynamic controller 102 may re-query the inventory database 120A for other suitable network resources to connect to the device 236 and if no further resources are available, may communicate an error message to the customer computing device 204 indicating that the requested network connection cannot be provisioned.

As the dynamic controller selects the device 242 as the sixth interconnecting device of the connection path 200, the dynamic controller 102 further accesses or retrieves a set of configuration attributes about the device 242 from the resource database 120B. The dynamic controller 102 is operable to extract the specific configuration attributes needed to ultimately configure the device 242 for the network connection requested in block 402, based on the type of device 242 and the connection parameters of the request, and stores such information temporarily in the memory of the dynamic controller 102. The configuration attributes may eventually be applied to the device 242 to, for example, configure a port or interface of the device 242 according to the connection parameters of the request, to configure a port or interface of the device 242 to route traffic associated with a particular VLAN ID as defined by the connection parameters of the request, and the like. In some embodiments, the dynamic controller 102 accesses such configuration attributes for the device 242 simultaneously as the device 242 is being added to the connection path 200 in memory of the dynamic controller 102.

As part of generating the connection path 200, the dynamic controller 102 may next address the UNI 2 250. Specifically, the dynamic controller 102 may query the resource database 120B referencing a device identifier associated with the UNI 2 250, to verify that the UNI 2 250 is available for use by the network connection. Assuming the resource database 120B reflects that the UNI 2 250 is in fact available for the network connection requested, the dynamic controller 102 may then update data within the resource database 120B to designate the UNI 2 250 as being reserved for the subject network connection, including any details as necessary about the type of network connection requested.

The dynamic controller 102 further accesses or retrieves a set of configuration attributes about the UNI 2 250 from the resource database 120B. The configuration attributes define the information needed to configure and activate the UNI 2 250 for the connection path 200 to be able to implement the network connection requested. In other words, the dynamic controller 102 is operable to extract the specific configuration attributes needed to ultimately configure the UNI 2 250. The configuration attributes may eventually be applied to the UNI 2 250 to, for example, configure the UNI 2 250 according to the connection parameters of the request, to configure the UNI 2 250 to receive and route traffic associated with a particular VLAN ID as defined by the connection parameters of the request, and the like. In the embodiment of FIG. 3A it is assumed that the device 242 is accessible to the UNI 2 250. As such, a seventh portion 200G of the connection path 200 is defined from the device 242 to the UNI 2 250.

Continuing with block 416 of FIG. 4, after accessing the configuration attributes, the dynamic controller 102 packages information associated with the configuration attributes for the NSO system 114 or other such configuration system. Specifically, once configuration information in the form of the configuration attributes has been obtained for all of the interconnected devices and the end points of the connection path 200, the configuration attributes may be inputted, populated, or otherwise packaged within a configuration file, such as an Extensible Markup Language (XML) file. In one embodiment, the configuration attributes for each device of the connection path 200 may be stored or formatted, using a Yet Another Next Generation (YANG) model and may be used as input parameters for the configuration file. The configuration file may eventually be transmitted to the NSO system 114, which can apply configurations 270 to the devices of the connection path 200 using the configuration file. A connection identifier for the network connection associated with the connection path 200 may be created by the dynamic controller 102 and populated within the configuration file, so that the configuration attributes specific to the connection path 200 can be referenced using the connection identifier for whatever reason, as described herein. The configuration attributes of the configuration file may define logical instances of the requested network connection.

The dynamic controller 102 may transmit the configuration file or otherwise make the configuration file accessible to the NSO system 114. As described herein, the NSO system 114 is operable to communicate with and apply configurations to different types of network devices. Using the configuration attributes of the configuration file, which may involve configuration attributes for different types of devices, the NSO system 114 can communicate with each of the devices of the path 200 and apply the configurations 270 to the interconnecting devices of the connection path 200 and the endpoint devices (the UNI 1 220, the UNI 2 250, the device 222, the device 226, the PE 1 device 228, the PE 2 device 232, the device 236, and the device 242). Applying the configurations 270 as disclosed may involve signaling out to the devices of the connection path 200, activating the devices, configuring the ports reserved for each of the interconnecting devices of the path 200 and the endpoints of the request, issuing commands to the devices, and the like. For example, the NSO system 114 may use the configuration file to access a first set of configuration attributes for the device 222. The NSO system 114 may issue one or more commands to the device 222, referencing the configuration attributes, activate a selected interface, to configure speed, and apply the configurations 270 defined by the configuration attributes to the device 222. Referencing the request of block 402 of FIG. 4, the NSO system 114 may configure the interface of the device 222 for VLAN traffic associated with a VLAN 11, as previously specified by the VLAN identifier of the request, so that network traffic associated with the VLAN 11 may be routed through the device 222, and the like. In other embodiments, the dynamic controller 102 may implement the configurations of the configuration file itself without assistance from the NSO system 114.

Once the NSO system 114 applies the configurations 270 to the devices associated with the connection path 200, the network connection defined by the connection parameters of the request of block 402 may essentially be provisioned as requested. In the example of FIG. 3A, upon application of the configurations 270 by the NSO system 114, a UNI-to-UNI network connection is established between the UNI 1 220 and the UNI 2 250, which may define an EVC. An EVC is an A-Z circuit that enables the transmission of network traffic associated with customer VLANs from one port on a node to another port in a network. As an EVC, a VLAN tag or identifier, such as the VLAN 11 of block 402, may be used for classification of the network connection and the devices of the EVC, such as the device 222, may be configured to define the forwarding or routing action of the network traffic with the VLAN tag of VLAN 11.

Utilizing VLAN tagging for the EVC of FIG. 3A as disclosed, an Ethernet data packet that is accessed or ingresses at the NID 210 may be tagged with a customer VLAN tag or identifier, such as the VLAN 11 of block 402. In some embodiments, a different VLAN identifier, or an S-VLAN, may be appended to the Ethernet data packet when the packet is routed within networks of the service provider. Specifically, as an Ethernet packet ingresses to the NID 210, an S-VLAN tag may be appended to the Ethernet packet, to assist with routing of the packet through the EVC and connection path 200 of FIG. 3A. Once the Ethernet packet arrives at the UNI 2 250, the S-VLAN tag may be removed, leaving the customer VLAN tag, associated with the VLAN 11.

Implementing the dynamic controller 102 in concert with the NSO system 114 as disclosed provides numerous technological improvements over conventional configuration and connection systems. For example, by organizing the totality of configuration attributes for each of a plurality of different network devices utilized for a network connection, in a single configuration file, application of the actual configurations to turn up the network connection is greatly simplified. In other words, the dynamic controller 102 transforms the connection parameters of a request for a network connection into a series of configuration attributes embodied within a specially configured configuration file, which may be conveniently applied by the NSO system 114 and is an inventive concept over conventional methods of generating such connections. The various validation steps by the dynamic controller 102 to, for example, verify that interfaces are available as requested, reduces the chance of errors occurring during configurations. Further, utilizing the API 106, a connection may be generated using the dynamic controller 102 with little or no involvement by a technician.

In addition to generating a network connection as described in FIG. 4, the dynamic controller 102 may be implemented to delete or teardown a network connection, generate a status of a particular network connection, and to modify a preexisting network connection, in response to a request. For example, in response to a customer request for a status of a network connection, a status code may be returned, or, a failure response message may be generated by the dynamic controller 102 with a predetermined failure code. A failure may have occurred due to insufficient network resources 130, or where the requesting customer is not authorized to access or obtain such a connection.

As another example, the dynamic controller 102 may be operable to delete or tear down a network connection associated with the connection path 200. A request to tear down a network connection may be received by the dynamic controller 102 by way of a call using the API 106 and may involve an HTTP DELETE method. An API 106 call to delete the network connection may reference the connection identifier associated with the connection path 200 and network connection. The dynamic controller 102 may transmit a request to delete the network connection associated with the connection path 200 to the NSO system 114 with reference to the connection identifier.

Using the connection identifier, the NSO system 114 may access the configuration file associated with the connection path 200, the configuration file having been marked, tagged, or populated with the connection identifier as described herein. The NSO system 114 may then use the configuration file to tear down and remove elements of the connection path 200 and terminate the connection associated with the same. Specifically, for example, the NSO system 114 may rollback, reverse, or otherwise remove the configurations 270 defined by the configuration attributes of the centralized file to tear down the connection path 200 and the associated network connection. In addition, the dynamic controller 102 may update information within the resource database 120B to release the network elements associated with the connection path. In other words, the dynamic controller 102 updates data of the resource database 120B so that any interfaces used by the connection path 200 are no longer reserved and may instead be designated as available for implementation with other network connections.

In some embodiments, the dynamic controller 102 may be implemented to modify network connections. For example, referencing the connection identifier, a customer may submit a request to modify an existing network connection to upgrade a class of service (COS) of the connection, or quality of service, from "Basic" to "Enhanced." The dynamic controller 102 may then reconfigure the network connection by identifying different network resources 130 for the network connection, referencing the databases 120, as needed to upgrade the network connection associated with the connection identifier.

Further discussion will now be provided regarding the other embodiments of connection paths in FIGS. 3B-3D. FIG. 3B and FIG. 3C represent other implementations of connection paths and network connections that may be generated using the dynamic controller 102. Specifically, FIG. 3B depicts the generation of a network connection path 300 for an EVC from a multiplexed UNI (such as UNI 1 220) to an Elynk interface 310. The connection path 300 may involve a first portion 300A, a second portion 300B, a third portion 300C, a fourth portion 300D, a fifth portion 300E, a sixth portion 300F, and a seventh portion 300G, that collectively define the connection path 300 similar to FIG. 3A. The NSO system 114 may apply configurations 302 using a configuration file generated by the dynamic controller 102 as discussed herein.

An ELynk interface, such as the Elynk 310, may involve a specialized interface that can be implemented to modify or re-map VLAN tags and may enable secure connections into data centers and/or cloud environments; thereby providing customers with redundancy and flexibility for services such as cloud services. The connection path 300 of FIG. 3B may be referred to as a UNI-ELYNK scenario. The connection path 300 may be implemented using the same or similar steps described in FIG. 4.

FIG. 3C depicts a connection path 312 similar to FIGS. 3A-3B. As shown, a network connection such as an EVC may be established from a multiplexed UNI (such as UNI 1 220) to an eLynk interface (such as the ELYNK 310) and further to a cloud system or service 320. The connection path 312 shown may be referred to as a UNI-ELYNK-CLOUD scenario. The connection path 312 may involve a first portion 312A, a second portion 312B, a third portion 312C, a fourth portion 312D, a fifth portion 312E, a sixth portion 312F, and a seventh portion 312G, that collectively define the connection path 312 similar to FIG. 3A. The NSO system 114 may apply configurations 314 using a configuration file generated by the dynamic controller 102 as discussed herein. The connection path 312 and the configuration file may be generated by the dynamic controller 102 using the same or similar steps of FIG. 4.

FIG. 3D shows another possible network connection path 350. The network connection path 350 comprises an EVC created by the dynamic controller 102 from a first cloud service provider or cloud service network interface to a second cloud service provider or cloud service interface. As shown, a cloud service 352 may comprise or be associated with a virtual private cloud (VPC) 354 and a virtual gateway (VGW) 356. Another cloud service 372 may comprise or otherwise be associated with a VPC 370 and a VGW 368. Using similar methods as described herein in FIG. 4, the cloud service 352 may be connected to the cloud service 372 by the dynamic controller 102. For example, the connection path 350 may be generated by the dynamic controller 102 that may involve a first portion 350A from the VGW 356 to a device 358 of the network resources 130. A second portion 350B may be generated by adding a PE device 360 to the connection path 350. A third portion 350C may be generated by adding a PE device 364. A fourth portion 350D may be generated by adding a device 366 to the connection path 350. A fifth portion 350E may be generated by adding the VGW 368 to the connection path 350. The NSO system 114 may apply configurations 374 using a configuration file generated by the dynamic controller 102 as discussed herein. The dynamic controller 102 may generate the connection paths of FIGS. 3B-3D and interact with the NSO system 114 to generate network connections using the same or similar methods described in FIG. 3A and FIG. 4.

The dynamic controller 102 is not limited to the aforementioned embodiments and other embodiments, features, and applications are contemplated. For example, in some embodiments, multiple connection paths may be generated by the dynamic controller 102 for use with multiple EVCs from a customer device such as the UNI 1 220. For example, a first EVC may be generated for the UNI 1 220 using connection parameters that define a basic level of service for the first EVC. A second EVC may be generated for the UNI 1 220 using connection parameters that define an enhanced level of service for the second EVC, such that network traffic and devices of the second EVC is faster or closer to real-time network speed. Network traffic for the first EVC may be distinguished from network traffic of the second EVC using different VLAN identifiers (and supplementing Ethernet frames with such information) as described herein. Each of the first and second EVCs may be associated with a particular classification and service instance. In other embodiments, the disclosed connections generated using the dynamic controller 102 may further be temporary. For example, the connection parameters may include a connection time identifier which may specify a range of time to keep the network connection active. Additional such embodiments and similar features are contemplated.

Figure 5:
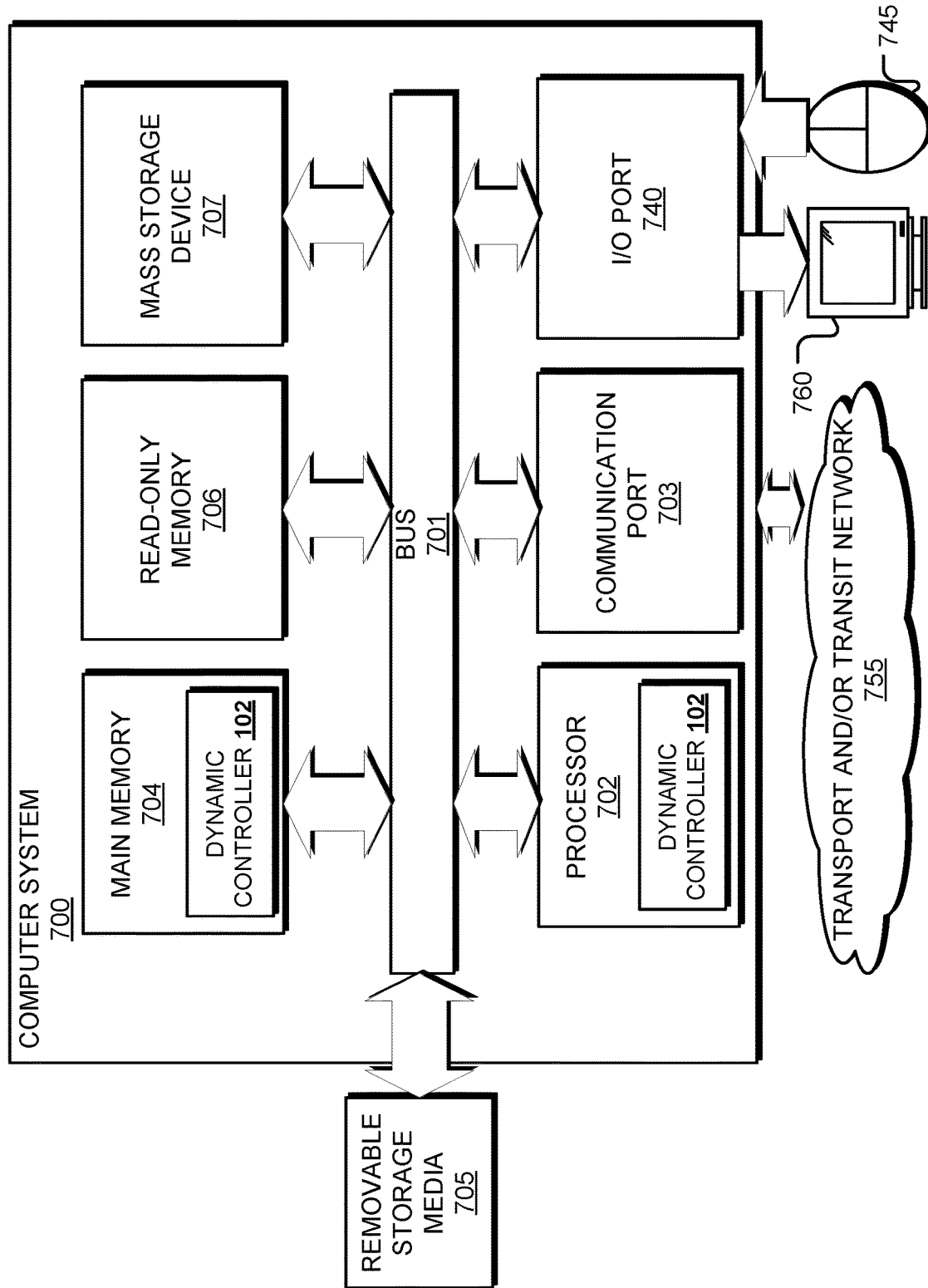
FIG. 5 depicts an exemplary computing system that may implement various services, systems, and methods discussed herein.

FIG. 5 is an example schematic diagram of a computing system 700 that may implement various methodologies discussed herein. For example, the computing system 700 may comprise a laptop, desktop, or server used to execute the dynamic controller 102 operable to provision data link layer connections dynamically across one or more networks. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing system 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a dynamic controller 102 or other application that supports functionality as discussed herein. For example, in one embodiment, the dynamic controller 102 may include or otherwise implement the various processes and/or instructions for provisioning data link layer connections dynamically across one or more networks as described herein. At least a portion of the dynamic controller 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the dynamic controller 102 and associated software modules stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of dynamically establishing a telecommunications service, comprising:
   utilizing a processor in communication with a tangible storage medium storing instructions that are executed by the processor to perform operations comprising:
   accessing a request to provision a network path between a first device and a second device, the request including a plurality of connection parameters defining the network path; and
   generating the network path, the network path comprising network resources that logically interconnect the first device with the second device, comprising:
   accessing data identifying a network resource from a database connectable to the first device,
   assigning the network resource to the network path and satisfying the plurality of connection parameters,
   accessing configuration attributes associated with the first device, the second device, and the network resource from the database to generate a configuration file for configuring the first device, the second device, and the network resource as defined by the plurality of connection parameter; and
   populating the configuration file with the configuration attributes as XML, data such that the configuration attributes can be transferred to a configuration system operable for applying the configuration attributes to the first device, the second device, and the network resource,
   wherein a portion of the configuration attributes are uniquely associated with the first device and are utilized to communicate with the first device to configure the first device for the network path.

2. The method of claim 1, further comprising:
   identifying the network resource by accessing information about possible network resources available to the first device from the database;
   wherein the first device comprises a first network interface device (NID) associated with a first multiplexed user network interface (UNI);
   wherein the network resource comprises a network device along the network path that logically interconnects the first device with the second device; and
   wherein the network path defines an Ethernet virtual connection.

3. The method of claim 2, further comprising:
   querying the database to identify an interface associated with the network resource that is available for connection to the first multiplexed UNI and satisfies the plurality of connection parameters; and
   generating a logical instance on the interface associated with the network resource to logically connect the first device with the network resource for the network path,
   wherein the database comprises network topology information including information about network resources encompassing the network path and interface availability associated with the network resources.

4. The method of claim 2, further comprising:
   accessing a request to view a plurality of interfaces available for connection with the first multiplexed UNI; and
   providing a list of interfaces in response to the request, the list of interfaces including a second interface associated with the second device,
   wherein the request to provision the network path between the first device and the second device includes a selection to connect the first multiplexed UNI associated with the first device with the second interface associated with the second device.

5. The method of claim 1, further comprising:
   validating the plurality of connection parameters, comprising:
   accessing information about rules limiting connections for the first device;
   determining whether the plurality of connection parameters satisfies the rules limiting connections for the first device; and
   accessing an inventory database to determine whether sufficient network elements of a telecommunications network are available to generate the network path as defined by the plurality of connection parameters.

6. The method of claim 1, further comprising generating a connection identifier associated with the network path and the configuration file,
   wherein the plurality of connection parameters includes an account identifier, a desired quality of service identifier, a bandwidth identifier, a first endpoint identifier associated with the first device, a second endpoint identifier associated with the second device, a request identifier defining the request, and at least one customer VLAN identifier.

7. The method of claim 6, further comprising:
   receiving a delete request to tear down the network path, the delete request referencing the connection identifier; and
   issuing a call to a configuration system to release the network resource used to generate the network path, the call referencing the connection identifier and the configuration file.

8. The method of claim 6, further comprising modeling the configuration attributes within the configuration file using a Yet Another Next Generation (YANG) model.

9. The method of claim 1, further comprising generating the network path with at least one provider edge (PE) device, a metro ring device, or a telecommunication core network.

10. The method of claim 1, further comprising:
    wherein the first device is associated with a first virtual gateway and a first virtual private cloud;
    wherein the second device is associated with a second virtual gateway and a second virtual private cloud; and
    wherein the network path logically connects the first virtual private cloud with the second virtual private cloud.

11. The method of claim 1, further comprising generating the network path by:
    issuing a first call to the database to identify a plurality of first network resources that are available and satisfy the plurality of connection parameters for the network path;
    logically interconnecting the plurality of first network resources to the first device to form a first portion of the network path;
    issuing a second call to the database to identify a plurality of second network resources that are available and satisfy the plurality of connection parameters for the network path;
    logically interconnecting the plurality of second network resources to the second device to form a second portion of the network path; and
    logically interconnecting the first portion of the network path with the second portion of the network path.

12. The method of claim 1, wherein the second device is associated with a cloud service provider such that the network path extends cloud service access to the first device.

13. The method of claim 1, further comprising generating the network path using a plurality of network devices of a type and role that have been predetermined to be able to satisfy the plurality of connection parameters.

14. The method of claim 1, further comprising:
receiving an Ethernet frame at the first device, the Ethernet frame comprising a customer VLAN identifier associated with a customer VLAN, the customer VLAN identifier further associated with a VLAN parameter defined within the plurality of connection parameters;
applying a service VLAN identifier to the Ethernet frame, the service VLAN identifier utilized by the network resource to route the Ethernet frame between the first device and the second device using the network path;
routing the Ethernet frame to the second device using the network path; and
removing the service VLAN identifier at the second device.

15. The method of claim 1, further comprising:
generating the network path such that first network traffic is routed according to a first bandwidth;
generating a second path to logically connect the first device with the second device, the second path routing second network traffic according to a second bandwidth; and
tagging a first plurality of Ethernet frames associated with the first network traffic with a first VLAN identifier and tagging a second plurality of Ethernet frames associated with the second network traffic with a second VLAN identifier at the first device to distinguish the first network traffic from the second network traffic.

16. An apparatus for a telecommunications service, comprising:
a computing device; and
a network device,
wherein the network device accesses an Ethernet virtual Connection (EVC) generated by the computing device, and
wherein the EVC is generating using a plurality of connection parameters and by referencing a database storing information about a plurality of network resources, and wherein the computing device is operable to:
generate a configuration file comprising configuration attributes associated with the network device and devices of the EVC, with data of the configuration file utilized for activating and configuring the devices of the EVC, and
populate the configuration file with the configuration attributes as XML data such that the configuration attributes can be transferred to a configuration system operable for applying the configuration attributes to the network device and the plurality of network resources,
wherein a portion of the configuration attributes are uniquely associated with the network device and are utilized to communicate with the network device to configure the EVC.

17. The apparatus of claim 16, further comprising:
wherein the computing device generates the EVC while satisfying the plurality of connection parameters;
wherein the EVC comprises at least one network resource of the plurality of network resources selected by the computing device to logically connect the network device with another device; and
wherein the database contains information about availability and technical specifications of the plurality of network resources.

18. A system for providing a telecommunications service, comprising:
a network interface device; and
a computing device, operable for:
receiving a request to provision a network path associated with the network interface device, the request comprising a plurality of connection parameters,
selecting a network resource to assign to the network path using the plurality of connection parameters, the network resource being connectable to the network interface device,
accessing configuration attributes for the network interface device and the network resource from a database,
generating a configuration file using data associated with the configuration attributes,
populating the configuration file with the configuration attributes as XML, data such that the configuration attributes can be transferred to a configuration system operable for applying the configuration attributes to network interface device and the network resource,
wherein a portion of the configuration attributes are uniquely associated with the network interface device and are utilized to communicate with the network interface device to configure the network interface device for the network path.

19. The system of claim 18, further comprising a cloud interface device, the cloud interface device remote from the network interface device, wherein the network path interconnects the network interface device with the cloud interface device.

* * * * *